United States Patent
Bilas et al.

(10) Patent No.: US 10,721,302 B2
(45) Date of Patent: Jul. 21, 2020

(54) NETWORK STORAGE PROTOCOL AND ADAPTIVE BATCHING APPARATUSES, METHODS, AND SYSTEMS

(71) Applicant: Foundation for Research and Technology—Hellas (FORTH), Heraklion, Crete (GR)

(72) Inventors: Angelos Bilas, Heraklion (GR); Maria Pilar Gonzalez Ferez, Murcia (ES)

(73) Assignee: FOUNDATION FOR RESEARCH AND TECHNOLOGY—HELLAS (FORTH), Heraklion (GR)

( * ) Notice: Subject to any disclaimer, the term of this patent is extended or adjusted under 35 U.S.C. 154(b) by 428 days.

(21) Appl. No.: 14/961,679

(22) Filed: Dec. 7, 2015

(65) Prior Publication Data

US 2016/0285971 A1  Sep. 29, 2016

Related U.S. Application Data

(60) Provisional application No. 62/088,318, filed on Dec. 5, 2014.

(51) Int. Cl.
*H04L 29/08* (2006.01)
*H04L 29/06* (2006.01)
(Continued)

(52) U.S. Cl.
CPC ...... *H04L 67/1097* (2013.01); *H04L 43/0888* (2013.01); *H04L 69/14* (2013.01);
(Continued)

(58) Field of Classification Search
CPC . H04L 67/1097; H04L 43/0888; H04L 69/14; H04L 69/22; H04L 69/32; H04L 69/321; H04L 47/125
See application file for complete search history.

(56) References Cited

U.S. PATENT DOCUMENTS 8,938,571 B1 * 1/2015 Vincent ................. G06F 12/023
                                                     370/429
9,450,780 B2 * 9/2016 Wang ..................... H04L 45/38
(Continued)

OTHER PUBLICATIONS j. Coburn, T. Bunker, M. Schwarz, R. Gupta, and S. Swanson, "From ARIES to MARS: Transaction support for next-generation, solid-state drives," in *Proceedings of the ACM Symposium on Operating Systems Principles*, 2013.
(Continued)

*Primary Examiner* — Tim T Vo
*Assistant Examiner* — Harry Z Wang
(74) *Attorney, Agent, or Firm* — Norton Rose Fulbright US LLP

(57) ABSTRACT

A computer network-storage protocol system, including at least one initiator device having an initiator block layer and an initiator network layer interfacing with a first network driver; at least one target device having a target block layer and a target network layer interfacing with a second network driver; a plurality of network interface controllers (NICs) interfacing with the first network driver and the second network driver; a plurality of distinct channels, each channel establishing a connection between the initiator device and the target device and being configured to transmit packets between the initiator device and the target device, wherein each channel is mapped to only one NIC; and wherein the initiator block layer includes at least one request message buffer and at least one data message buffer.

18 Claims, 18 Drawing Sheets

(51) Int. Cl.
H04L 12/26 (2006.01)
H04L 12/803 (2013.01)
(52) U.S. Cl.
CPC .............. H04L 69/22 (2013.01); H04L 69/32 (2013.01); H04L 69/321 (2013.01); H04L 47/125 (2013.01)

(56) References Cited

U.S. PATENT DOCUMENTS

| | | | | |
|---|---|---|---|---|
| 2004/0260972 | A1* | 12/2004 | Ji | G06F 11/2066 714/11 |
| 2009/0016217 | A1* | 1/2009 | Kashyap | H04L 47/2408 370/231 |
| 2012/0266211 | A1* | 10/2012 | Mugundan | G06F 11/1443 726/3 |
| 2013/0326033 | A1* | 12/2013 | Gomez | H04L 49/00 709/223 |
| 2014/0122634 | A1* | 5/2014 | Conner | G06F 13/4027 709/212 |
| 2014/0254594 | A1* | 9/2014 | Gasparakis | H04L 45/74 370/392 |
| 2015/0052280 | A1* | 2/2015 | Lawson | G06F 13/28 710/308 |
| 2015/0160884 | A1* | 6/2015 | Scales | G06F 3/0608 711/114 |
| 2015/0215209 | A1* | 7/2015 | Pirko | H04L 45/245 370/235 |
| 2015/0263968 | A1* | 9/2015 | Jain | H04L 47/36 370/235 |
| 2016/0062802 | A1* | 3/2016 | Guan | G06F 9/4881 711/148 |

OTHER PUBLICATIONS

C. Li, C. Ding, and K. Shen, "Quantifying the Cost of Context Switch," in *Proceedings of the Workshop on Experimental Computer Science*, 2007.
J. Gim, T. Hwang, Y. Won, and K. Kant, "SmartCon: Smart Context Switching for Fast Storage IO Devices," *Transactions on Storage*, vol. 11, No. 2, pp. 5:1-5:25, Mar. 2015.
A. Belay, G. Prekas, A. Klimovic, S. Grossman, C. Kozyrakis, and E. Bugnion, "IX: A Protected Dataplane Operating System for High Throughput and Low Latency," in *Proceedings of the 11th USENIX Symposium on Operating Systems Design and Implementation (OSDI 14)*, 2014.
S. Swanson and A. M. Caulfield, "Refactor, Reduce, Recycle: Restructuring the I/O Stack for the Future of Storage," *Computer*, vol. 46, No. 8, pp. 52-59, 2013.
M. Flajslik and M. Rosenblum, "Network Interface Design for Low Latency Request-Reponse Protocols," in *Proceedings of the USENIX Annual Technical Conference*, 2013.
A. Kalia, M. Kaminsky, and D. G. Andersen, "Using RDMA Efficiently for Key-Value Services," in *Proceedings of the ACM Conference on Special Interest Group on Data Communication (SIGCOMM)*, 2014.
C. Mitchell, Y. Geng, and J. Li, "Using One-Sided RDMA Reads to Build a Fast, CPU-Efficient Key-Value Store," in *Proceedings of the 2013 USENIX Conference on Annual Technical Conference*, 2013.
A. Dragojevic', D. Narayanan, O. Hodson, and M. Castro, "FaRM: Fast Remote Memory," in *Proceedings of the 11th USENIX Conference on Networked Systems Design and Implementation*, 2014.
P. Studei, B. Metzler, and A. Trivedi, "jVerbs: Ultra-Low Latency for Data Center Applications," in *Proceedings of the Annual Symposium on Cloud Computing*, 2013.
R. Kapoor, G. Porter, M. Tewari, G. M. Voelker, and A. Vandat, "Chronos: Predictable Low Latency for Data Center Applications," in *Proceedings of the ACM Symposium on Cloud Computing*, 2012.
Anderson, T.E.: The Performance of Spin Lock Alternatives for Shared-Memory Multiprocessors. IEEE Trans. Parallel Distrib. Syst. 1(1), 6-16 (1990).
Bjørling,M., Axboe, J., Nellans,D., Bonnet,P.: Linux Block IO:Introducing Multi-queue SSD access on Multi-core Systems. In: Proceedings of the 6th International Systems and Storage Conference (2013).
Cosmin Dumitru Ralph Koning, C.d.Laat.: 40 Gigabit Ethernet: Prototyping Transparent End-to-End Connectivity. In: Proceedings of the Terena Networking Conference (2011).
Dice, D., Marathe, V.J., Shavit, N. Lock Cohorting: A General Technique for Designing NUMA Locks. ACM Transactions on Parallel Computing 1(2), 13:1-13:42 (2015).
Moreaud, S., Goglin, B.: Impact of NUMA Effects on High-Speed Networking with Multi-Opteron Machines. In: Proceedings of the International Conference on Parallel and Distributed Computing and Systems (2007).
Pesterev, A., Strauss, j., Zeldovich, N., Morris, R.T.: Improving Network Connection Locality on Multicore Systems. In: Proceedings of the 7th ACM European Conference on Computer Systems (2012).
Radovic, Z., Hagersten, E.: Hierarchical Backoff Locks for Non-uniform Communication Architectures. In: Proceedings of the 9th International Symposium on High-Performance Computer Architecture, pp. 241-252. IEEE Computer Society, Washington, DC, USA (2003).
Ren, Y., Li, T., Yu, D., Jin, S., Robertazzi, T.: Design and Performance Evaluation of NUMA-aware RDMA-Based End-to-end Data Transfer Systems. In: Proceedings of international conference for High Performance Computing, Networking, Storage and Analysis (2013).

* cited by examiner (a) Read Requests (a) Write Requests (a) Read Requests (a) Write Requests (a) Read Requests (a) Write Requests (a) 4kB Request Size (a) 512kB Request Size (a) Read requests (b) Write requests

NETWORK STORAGE PROTOCOL AND ADAPTIVE BATCHING APPARATUSES, METHODS, AND SYSTEMS

CROSS-REFERENCE TO RELATED APPLICATION

This application claims priority under 35 U.S.C. § 119 to U.S. Provisional Patent Application No. 62/088,318, filed Dec. 5, 2014, the contents of which are incorporated by reference herein in their entirety.

FIELD

This disclosure is directed generally to apparatuses, methods, and systems for data storage, manipulation and management, and more particularly, to NETWORK STORAGE PROTOCOL AND ADAPTIVE BATCHING APPARATUSES, METHODS, AND SYSTEMS ("Tyche").

BACKGROUND

In many datacenters, storage is typically a separate tier from application servers and access happens mostly via a storage area network (SAN). Current efforts to improve efficiency of datacenters in terms of reduced energy consumption and reduced operational expenses are focused on creating less expensive storage solutions. One way to do this is to bring storage closer to applications and computation by converging the two tiers. Converged storage advocates placing storage devices, such as solid state disks or non-volatile memory (NVM), in all servers where computation occurs and adapting the current input/output (I/O) stack to the new model. In the converged storage model, many storage accesses require crossing the network for various reasons, such as additional storage capacity, reliability, and sharing. Storage requests are therefore exchanged between all servers, and the network protocol used plays an important role.

There are many advantages to using Ethernet-based physical networks for storage. A single Ethernet network for network and storage data traffic reduces cost and complexity. In the past, there has been a significant amount of research on interconnects that scale and impose low overheads. However, such interconnects are unlikely to dominate and displace Ethernet in the datacenter. For this reason, the network protocol used on top of Ethernet plays a significant role in achieving high efficiency for remote storage access.

Current technology trends for efficient use of infrastructures dictate that storage converges with computation by placing storage devices, such as NVM-based cards and drives, in the servers themselves. With converged storage, the role of the interconnect among servers becomes more important for achieving m high I/O throughput. Given that Ethernet is emerging as the dominant technology for datacenters, reducing protocol overheads for accessing remote storage over Ethernet interconnects is becoming increasingly important.

SUMMARY

The design, implementation, and evaluation of Tyche is disclosed. In one implementation, Tyche is a networked storage protocol that is deployed directly on top of Ethernet and provides efficient access to remote storage without requiring hardware support from the network interface. Tyche may reduce overheads via a copy-reduction technique, pre-allocation of memory, custom network queues and structures, and storage-specific packet processing. In addition, Tyche may be able to transparently and simultaneously use multiple NICs and to scale with the number of links and cores via proper packet queue design, NUMA affinity management, and reduced synchronization.

A computer network-storage protocol system is disclosed. The system includes at least one initiator device having an initiator block layer and an initiator network layer interfacing with a first network driver; at least one target device having a target block layer and a target network layer interfacing with a second network driver; a plurality of network interface controllers (NICs) interfacing with the first network driver and the second network driver; and a plurality of distinct channels, each channel establishing a connection between the initiator device and the target device and being configured to transmit packets between the initiator device and the target device. Each channel is mapped to only one NIC, and the initiator block layer includes at least one request message buffer and at least one data message buffer. The system may also include a transmission structure in the initiator network layer, and a receiving structure and notification structure in the target network layer. The transmission structure and the receiving structure may be accessed only via non-blocking atomic operations.

A method of initializing a network stack is also disclosed. The method includes: opening a plurality of channels between an initiator device and a remote target device; exchanging information between the initiator device and the remote target device during a handshake phase; creating a local virtual device on the initiator device for the remote target device; mapping each of the plurality of channels to a single network interface controller; receiving an input/output (I/O) request from a file system at the initiator device to be issued to the remote target device; and transmitting the I/O request through one of the plurality of channels, wherein the channel passes through a block layer and a network layer in the initiator device as well as a block layer and a network layer in the remote target device.

A network storage system is also disclosed. The network storage system includes: a plurality of networked memory devices; a plurality of processors operably connected to the memory devices; at least one initiator residing in at least one of the plurality of networked memory devices and having an initiator block layer and an initiator network layer interfacing with a first network driver; at least one target device residing in at least one of the plurality of networked memory devices and having a target block layer and a target network layer interfacing with a second network driver; a plurality of network interface controllers (NICs) interfacing with the first network driver and the second network driver; and a plurality of distinct channels, each channel establishing a connection between the initiator device and the target device and being configured to transmit packets between the initiator device and the target device, wherein each channel is mapped to only one NIC. The initiator block layer includes at least one request message buffer and at least one data message buffer.

BRIEF DESCRIPTION OF THE DRAWINGS

The accompanying drawings illustrate various non-limiting, example, inventive aspects of Tyche.

DETAILED DESCRIPTION

Figure 1:
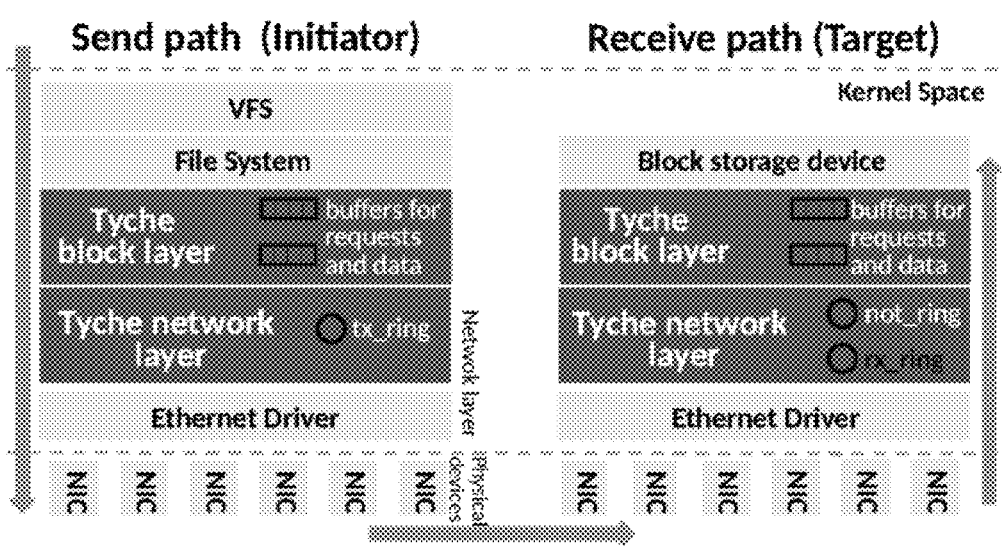
FIG. 1 is a block diagram illustrating exemplary network architecture that may be used according to an implementation of Tyche.

The NETWORK STORAGE PROTOCOL AND ADAPTIVE BATCHING APPARATUSES, METHODS, AND SYSTEMS ("Tyche") can provide a network storage protocol directly on top of Ethernet, which does not require any hardware support from the network interface. Tyche may be deployed in existing infrastructures and can co-exist with other Ethernet-based protocols. In one exemplary embodiment, Tyche presents remote storage as a local block device and can support any existing file system. Tyche may provide several advantages over other systems, including a reduction of host-level overheads, and scaling with the number of cores and network interfaces in a server. In one embodiment, Tyche may increase I/O throughput in servers. Tyche may also reduce overheads via a copy-reduction technique, storage-specific packet processing, pre-allocation of memory, and using RDMA (remote direct memory access)-like operations without requiring hardware support. Tyche may also transparently handle multiple network interface controllers (NICs) and offer improved scaling with the number of links and cores via reduced synchronization, proper packet queue design, and non-uniform memory access (NUMA) affinity management. For low degrees of I/O concurrency and small requests, Tyche may reduce overhead by avoiding context switches. For high degrees of I/O concurrency but small requests, Tyche may include an adaptive batching mechanism to achieve high link utilization.

In one exemplary implementation, Tyche may achieve scalable I/O throughput, up to 6.4 GB/s for reads and 6.8 GB/s for writes with 6×10 Gigabit Ethernet (GigE) NICs. By using NUMA affinity as part of its protocol, Tyche performs better by up to one order of magnitude, when compared to network block devices (NBD).

Table I provides a summary of storage-specific and general-purpose network protocols based on Ethernet. These protocols can be further classified into two categories, based on whether they require hardware support. Software-only protocols typically exhibit relatively low throughput for small requests and incur high overheads. One reason for this is that they either use mostly TCP/IP (Transmission Control Protocol/Internet Protocol) or they are not optimized for storage. TCP/IP inherently incurs high overheads due to its streaming semantics. On the other hand, hardware-assisted protocols usually obtain maximum link throughput at lower CPU (Central Processing Unit) overheads, but they require custom NICs or other extensions to the underlying interconnect, which is a significant impediment for deployment and adoption.

TABLE I

|  | Software | Hardware |
| --- | --- | --- |
| Storage | NBD, iSCSI, AoE, FCoE | iSER, SRP, gmblock |
| Generic | PortLand | iWARP, RoCE, JNIC |

Tyche addresses the issues associated with networked storage access over Ethernet, and in one embodiment, provides a network storage protocol that achieves high efficiency without requiring any hardware assistance. Tyche may be deployed in existing infrastructures and may co-exist with other Ethernet-based protocols. For example, the Tyche approach is the first to achieve 90% of link efficiency for 16 kB request sizes without any specialized hardware support.

Given current technology trends, servers will soon host hundreds of cores and hundreds of GBits/s of network throughput and will mainly access remote storage devices. Typical servers already employ 64 cores and multiple 10 GBits/s Ethernet NICs. Tyche provides low-overhead communication by carefully considering protocol operations, structures in the common path, memory management, and synchronization required to access networked storage.

Tyche addresses the problem of host-overhead for remote storage access. The I/O throughput provided by current network storage protocols, such as Network Block Device (NBD), is limited to a small percentage of the network throughput. For instance, NBD achieves around 600 MB/s for sequential reads and writes, which is far from the 1.2 GB/s provided by the NIC. In addition, NBD requires requests of 1 MB in size and requires 100% of CPU utilization to provide this 600 MB/s; in contrast, Tyche can achieve the same throughput at 4 kB requests and only 50% CPU utilization.

Tyche also addresses the problem of transparent use of multiple NICs. Current network storage protocols are only able to use a single NIC. Tyche is capable of transparently sharing multiple NICs from many cores, which increases synchronization and memory management overhead. For instance, by using a fine-grain approach for assigning NICs to cores at the packet level, Tyche can provide significant synchronization at high network speeds.

To reduce host overheads, Tyche can efficiently map I/O requests to network messages, pre-allocate memory, and handle NUMA affinity. The pre-allocation and placement of buffers may be done per channel (by forming a connection between initiator and target). Tyche may use a copy reduction technique based on virtual memory page remapping to reduce packet processing cost. Indeed, Tyche may avoid all copies for write requests by taking advantage of storage semantics, but may require a single copy for reads at the initiator side, due to operating-system kernel semantics for buffer allocation.

To limit synchronization, Tyche can use a connection abstraction to privatize the main structures (rings and memory buffers) and thread processing context, which are typically shared in known protocols. Mapping cores to channels and channels to links allows for flexibility in managing the amount of throughput available to each application.

In addition, for small I/O requests, Tyche may include a mechanism to reduce overhead by reducing context switches for low degrees of I/O concurrency. Tyche may also incorporate a batching technique to achieve high link utilization under high degrees of I/O concurrency. While batching has been used extensively in both networking and storage systems, Tyche provides a novel dynamic technique that varies the degree of batching to match the load at a fine grain, without a negative impact on I/O overhead and response time.

Experimental results show that Tyche can achieve scalable throughput of up to 6.4 GB/s and 6.8 GB/s for sequential reads and writes, respectively, on 6×10 Gbits/s network devices. Results also show that, to achieve maximum throughput, NUMA affinity should be taken into account, otherwise, throughput drops by up to 2×. When comparing Tyche against NBD, for sequential reads and writes, Tyche outperforms NBD by an order of magnitude when using six NICs, and by about 2× with a single NIC. For actual applications, Tyche significantly increases throughput, for instance, for Psearchy Tyche achieves 2× and 8× better throughput compared to NBD, when using one and six NICs, respectively.

By avoiding context switches, Tyche can reduce host CPU overhead by 30.8% per 4 kB-I/O request, about equally divided between the client (initiator) and server (target), and by up to 61% by taking into account only the Tyche send/receive path, excluding processing done by layers above Tyche. By using dynamic batching, Tyche can improve link utilization by up to 56.9% and 53% for reads and writes, respectively, when compared to the link utilization obtained without batching.

System Design

FIG. 1 depicts the overall design of one embodiment of Tyche. As shown, Tyche may be composed of a block layer and a network layer. In one embodiment, the block layer is in charge of managing I/O requests and I/O completions, while the network layer is in charge of network messages and packets. In one embodiment, Tyche is a network storage protocol on top of raw Ethernet that achieves high I/O throughput and low latency without any hardware support. Tyche may present a remote storage device locally by creating at the client (initiator) a virtual local device, that can be used as a regular block device. Tyche can be independent of the storage device, and may be configured to support any existing file system.

Figure 2:
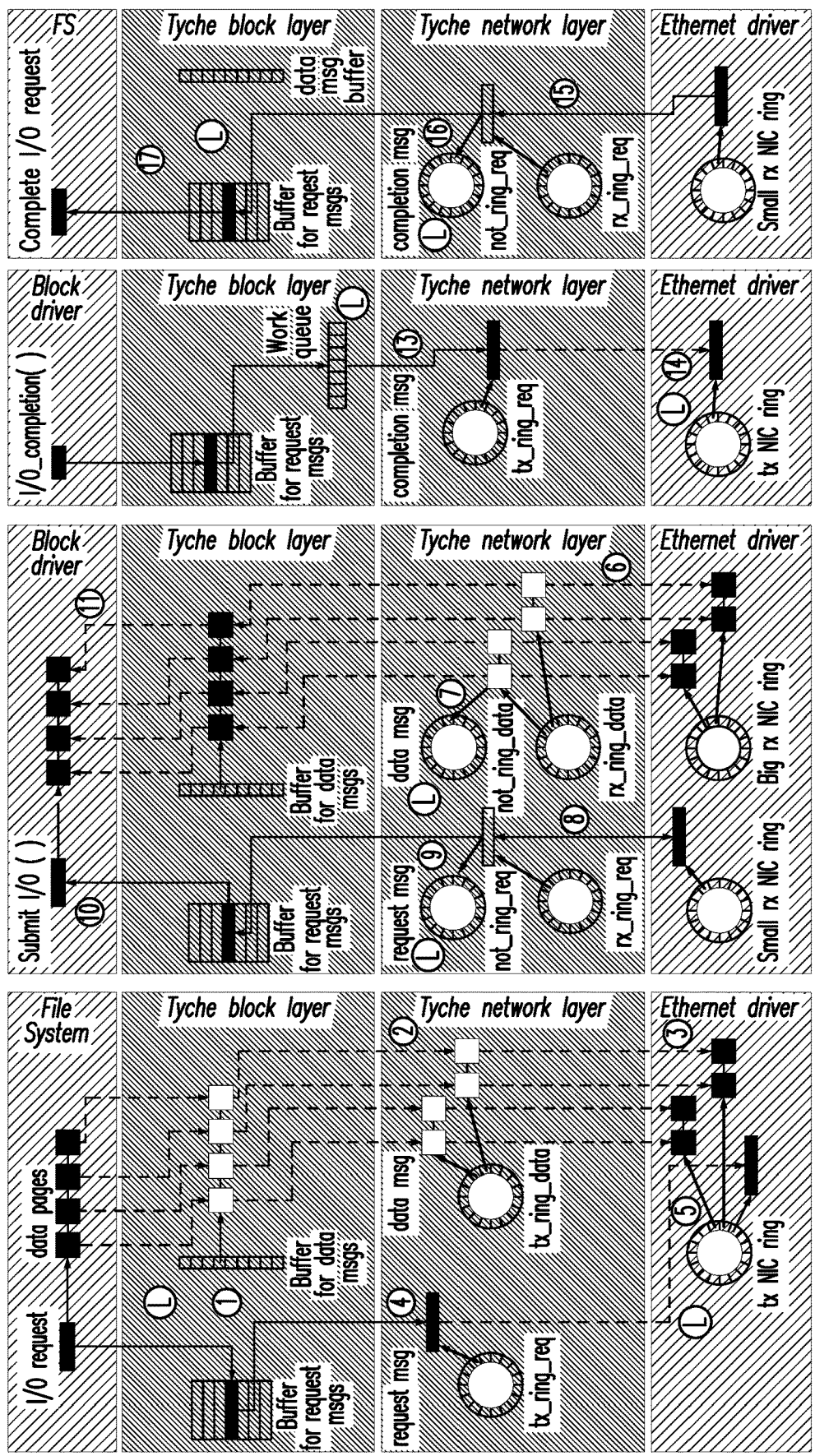
FIG. 2 shows an end-to-end I/O path through a channel for a write request in one embodiment of Tyche.

FIG. 2 depicts an exemplary end-to-end I/O path through Tyche for a write request. A read may follow the same path, but the data message would be sent from the target to the initiator. As shown in FIG. 2, the lines and numbers provide the steps of the path and the execution order. The solid lines indicate that there is a copy of data, and the dashed lines indicate that there is no copy of data. The label "L" indicates that this action requires a lock for synchronization purposes. Each step in this exemplary end-to-end path, labeled 1-17 in FIG. 2, is explained in greater detail below. Although reference is made in this disclosure to transmission and receiving rings, it should be understood than any other suitable transmission structure or receiving structure, including a table or a queue, can also be used in Tyche.

Step 1: At the initiator side, for each new I/O request, Tyche selects one channel. On this channel, Tyche fetches one request message from the request message buffer and one data message from the data message buffer. The initiator composes the messages and it associates the pages of the I/O request to the data message. Note that for writes, these pages are sent to the target, and for reads, upon arrival, data is directly placed on these pages.

Steps 2, 3, 4 and 5: For write requests, the data message is transmitted by dividing it into small data packets. For each data packet, a position on the transmission ring for data packets (tx_ring_data) is requested, the data packet is composed and it is transmitted through the NIC ring. Then, the request message is transmitted, by getting a position on the transmission tx_ring_req ring, composing the corresponding request packet, and issuing it through the NIC. Note that for read requests, Tyche only sends the request message to the target. Therefore, steps 2 and 3 will not be run and they will be omitted.

Steps 6 and 7: At the target side, dedicated network threads, one per NIC, process incoming packets, compose messages, and generate a notification to Tyche. In one implementation, the interrupt handler of the NIC is only used for waking up the corresponding network thread. The network thread fetches a data packet, places it in a position of the rx_ring_data (previously assigned on the send path). Then it processes the data message by interchanging data pages between the NIC receive ring and the pages of the data message buffers. Once the data message is processed, a notification is placed in the not_ring_data to inform the block layer that a data message has arrived.

Steps 8 and 9: A request packet, that is small in size, is received in the small receive ring of the NIC driver. The network thread processes the corresponding message and copies it to the corresponding position on the request message buffer. A request packet is processed by using the rx_ring_msg of the Tyche network layer. The message itself is copied directly from the NIC receive ring to the message buffer, without doing an intermediate copy on the rx_ring_msg. Then, a notification for the request message is placed into the not_ring_req.

Steps 10 and 11: As a consequence of the notification, at the block layer, a thread processes the request message and fetches the corresponding data message (in case of a write request). Then, the thread constructs a proper Linux kernel I/O request and submits it to the local block device.

Step 12: At the target, the I/O completion of the local request schedules a task on a work queue to send the completion back to the initiator. Note that a completion message is sent through the same channel through which its request message was sent and by using the same message. Thus, to transmit a completion message, the channel selection is not needed and a new message is not required.

Steps 13 and 14: A work queue thread issues the completion back to the initiator through the I/O network path of Tyche. A completion message is managed as a request message, therefore similar steps are executed. First, a position on the tx_ring_req is requested, then the corresponding packet is composed, and this packet is transmitted through the NIC.

Steps 15 and 16: When a completion arrives at the initiator, the network thread processes the packet, constructs the message and generates the notification to the block layer. Similar to the request message at the target, a completion message is received in the small receive ring of the NIC driver, and from there it is copied to its position on the request message buffer. The corresponding notification is placed into the not_ring_req.

Step 17: As a consequence of the notification, at the block layer, a thread processes the completion message, and it completes the regular I/O request. Finally, the request and data messages are freed.

Communications Channels

In one exemplary embodiment, Tyche uses one or more communication channels to establish a connection between initiator and target. Each communication channel allows a host to send/receive data to/from a remote host. Thus, Tyche can be a connection-oriented protocol that allows the creation of multiple channels between initiator and target. A channel may be directly associated to the network interface controller (NIC) that it uses for sending/receiving data. Although a channel is mapped to a single NIC, several channels can be mapped to the same NIC. Tyche is able to simultaneously manage several channels, and create at least one communication channel per NIC. As a result, Tyche is capable of handling several NICs transparently.

To minimize synchronization for shared structures, and to allow scaling with the number of NICs and cores, Tyche may allocate all the resources per channel, giving each channel its own private resources. Since the NIC driver also allocates resources per NIC (transmission and receiving rings), these resources may be shared by all the channels using the same NIC.

To initialize the network stack, Tyche may open several channels, one per available NIC, between initiator and target. During the handshake phase, for each channel, initiator and target exchange information about resources. Then the initiator creates a local device for the remote device, and is then ready to receive I/O requests for this new device. When several channels are open for the same remote device, Tyche may implement a scheduler to select a channel through which the next I/O request will be issued, as will be described in greater detail bellow. This scheduler may use a fairness metric, by default equal kBs to each channel, and NUMA information to select one channel.

Network Messages

As shown in FIG. 2, Tyche may receive a regular I/O requests from a file system to be issued to a remote device. The I/O request may be composed of parameters such as request type, logical block addressing (LBA) sector, size, and flags, and pages with data to be written or where to place data to be read. In one embodiment, Tyche supports two different message types: request messages and data messages. Request messages may be used for transferring request parameters, and also for sending I/O completions back from a target to an initiator. Data messages may be used for sending data pages. Tyche may be configured to always send a request message as well as its data and completion messages through the same channel.

A request message corresponds to a single request packet, that is small (less than 100 bytes in size), and is transferred using an Ethernet frame. Data messages are sent via remote direct memory access (RDMA)-type messages by using scatter-gather lists of memory pages (I/O buffers). The corresponding data packets may be transferred in separate Jumbo Ethernet frames of 4 or 8 kB. A data packet can carry at most two 4 kB pages, so in one embodiment, a data message for an I/O request of N pages corresponds to N/2 data packets.

Main Data Structures

In one exemplary embodiment, Tyche reduces the overhead required for memory management by providing each channel with its own pre-allocated private resources. As shown in FIGS. 1 and 2, at the block layer, each channel has two separate and pre-allocated buffers, one for request messages and one for data messages. Messages can be sent and received using these buffers. In one embodiment, I/O completions are handled as request messages, and are prepared in the same buffer where the corresponding request message was received.

In one exemplary embodiment, at the target, the buffer for data messages contains lists of pre-allocated data pages, as shown in FIG. 2. The target may use these pages for not only sending and receiving data messages but also issuing regular I/O requests to the local device. In one exemplary embodiment, the initiator has no pre-allocated pages, and the initiator uses pages already provided by regular I/O requests for sending or receiving data messages thus avoiding making any extra copy of data.

In one exemplary embodiment, although both initiator and target may allocate these buffers, the initiator handles the buffers from both sides. During the connection handshake phase, the buffer information is exchanged, so the initiator knows all necessary identification handlers of the target buffers. For each message, the initiator specifies, in the packet header, its positions on the corresponding buffer, and, on its reception, a message is directly placed on its buffer's position. For instance, the initiator may specify on behalf of the target the position (pages) where data packets have to be placed when they arrive (for writes), and the target may use these pages for submitting the regular I/O write requests.

In addition, to reduce synchronization, each channel may use its own private network rings. Therefore, at the network layer, each channel may use three rings, as shown in FIG. 2: one for transmitting (TX_ring), one for receiving, (RX_ring), and one for notifications, (Not_ring). In one embodiment, Tyche may be configured to handle two kinds of packets (request and data packets), so that each channel has two instances for each ring. A request packet may be sent using TX_ring_req, received in RX_ring_req, and its notification may be placed in Not_ring_req. In the same way, a data packet may use TX_ring_data, RX_ring_data and Not_ring_data.

Figure 3:
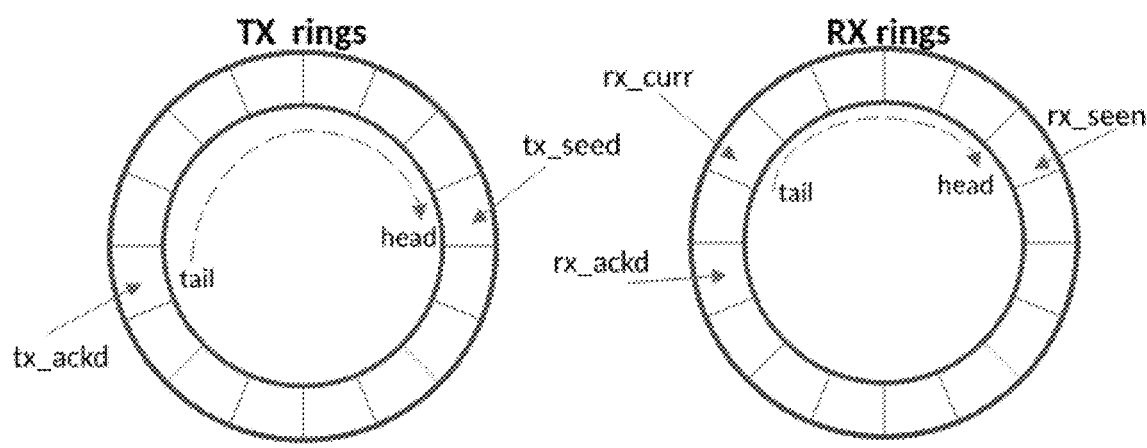
FIG. 3 shows an exemplary embodiment of a networking rink protocol structure used in a send and receive path according to an implementation of Tyche.

FIG. 3 illustrates an exemplary networking ring protocol structure used in the send and receive path in one exemplary embodiment of Tyche, including a transmission ring (TX ring) and a receiving ring (RX ring) As shown, each ring may use only two pointers, a head and a tail, to reduce synchronization. The head points to the last packet sent (tx_seen) or received (rx_seen). The tail points, for the transmission ring, to the last packet currently acknowledged by the remote node (tx_ackd), and, for the receive and notification rings, to the last packet currently processed (rx_curr). In addition, the receiving ring may include a third pointer (rx_ackd) to the last packet currently acknowledged towards the remote node. Other implementations may use additional pointers for handling rings. For example, the transmission ring may include a third pointer for controlling packets currently sent by the NICs. However, this pointer can be avoided because a position can only be re-used when its corresponding ACK has been received, and if a packet is acknowledged, it is because the NIC has sent it. This approach delays certain protocol processing, but allows Tyche to reduce synchronization overhead.

Each cell of the transmission ring may have two fields to denote its state: that the packet is ready to be sent, or that the packet has been sent. These fields may be used by Tyche when the NIC is busy and the sending of packets has to be delayed. Each cell of the receive ring may also have a field to denote that the packet has arrived and to control packets that arrive several times due to re-transmissions. These two fields may be updated by non-blocking atomic operations, that is, an operations during which one or more processes can simultaneously read or write a location without blocking.

Network I/O Path

FIG. 2 illustrates the end-to-end I/O path of a write request. FIGS. 4, 5, 6, 7, and 8 summarize this flow path as well. In these figures, the numbers on the arrows denote the execution order of the actions during exemplary operation of Tyche. In FIG. 2, operations marked with the label "L" indicate actions that require synchronization. For simplicity, the figures do not include error handling and retransmission paths.

In one exemplary embodiment, at the initiator side, for each new I/O request, Tyche selects one channel. On this channel, Tyche gets one request message and one data message from the corresponding buffers. The initiator composes the request message and associates the pages of the I/O request to the data message.

Figure 4:
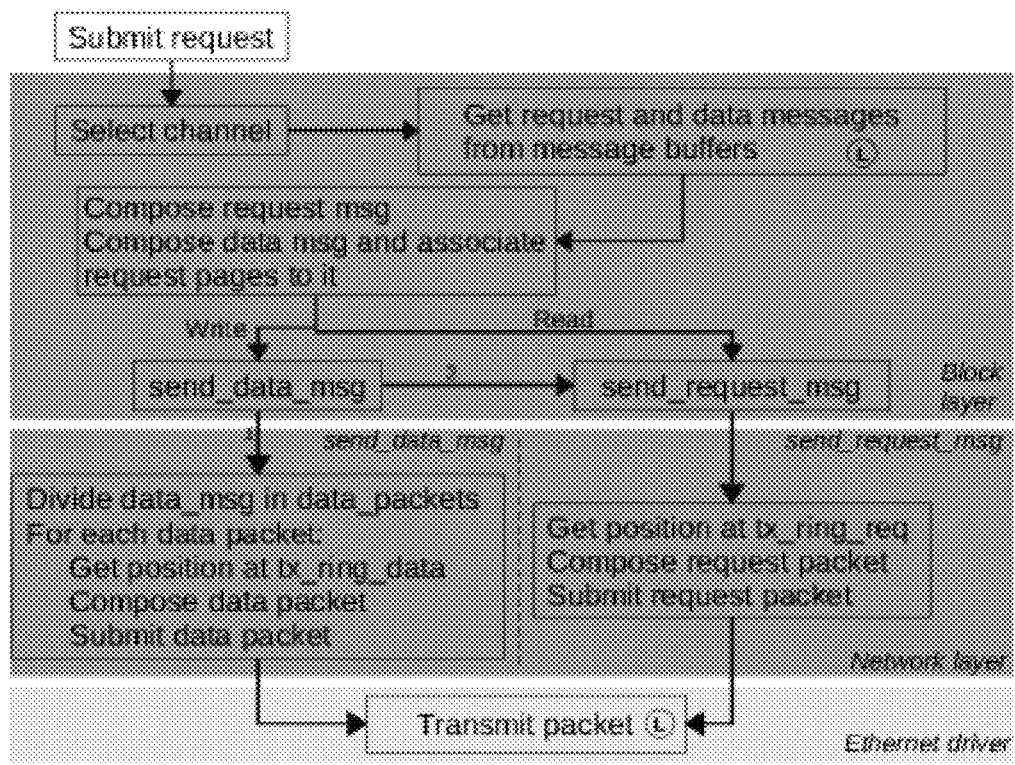
FIG. 4 shows an overview of an implementation of a send path in an initiator in one implementation of Tyche.

In one exemplary embodiment, Tyche can operate in two different modes. In the first, "inline" mode (FIGS. 1 and 2), the application context issues I/O requests to the target, without requiring any context switch in the issue path. In the second, "queue" mode, regular I/O requests are inserted in a Tyche queue, and several Tyche threads dequeue these I/O requests and issue them to the target. With the queue mode, the issuing context blocks just after enqueuing the request. FIG. 4 shows how the initiator issues a network I/O request in the inline mode. The queue mode is similar, with local I/O requests being inserted in a queue and a Tyche thread executing the issue path for each request.

Figure 5:
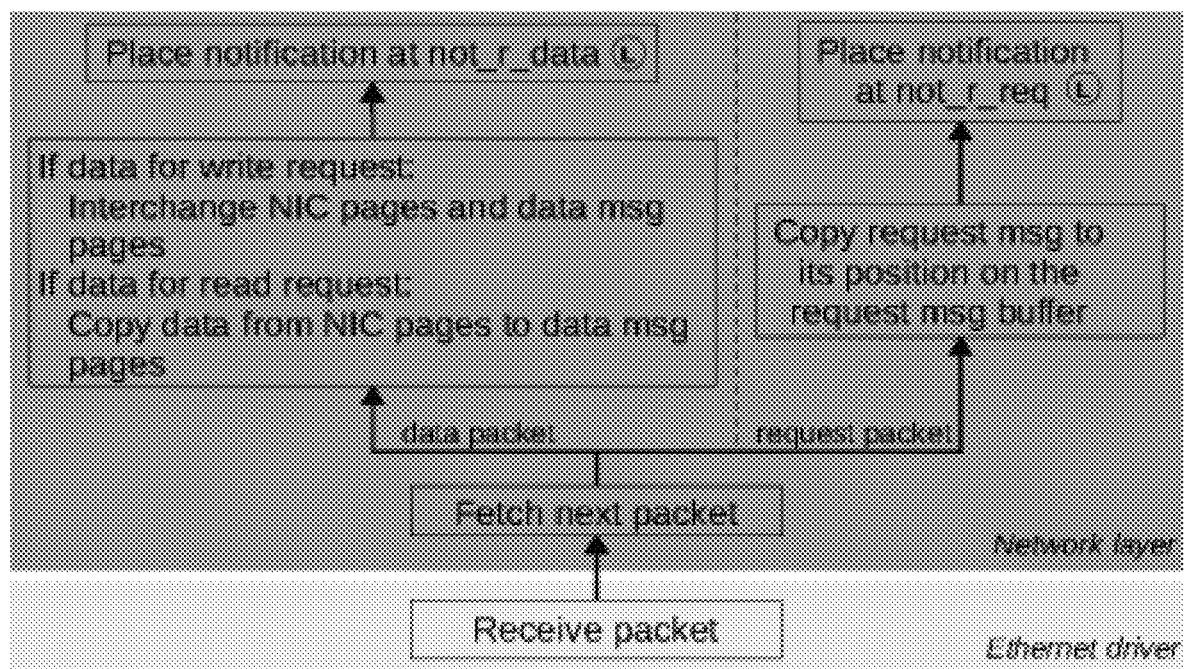
FIG. 5 shows an overview of an implementation of a receive path in one implementation of Tyche.
Figure 6:
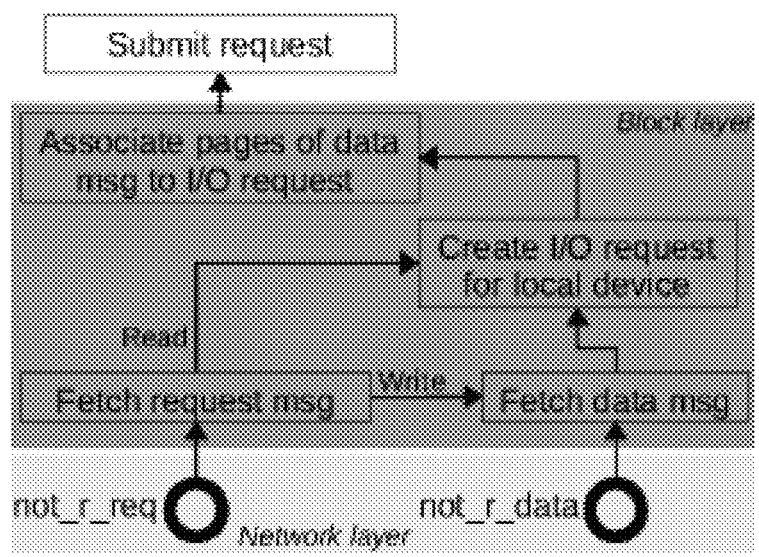
FIG. 6 shows an overview of a receive path in a target at the network layer in one implementation of the Tyche.

At the target side, dedicated network threads, one per NIC, process incoming packets, compose messages, and generate a notification to Tyche. The interrupt handler of the NIC may be used for waking up the corresponding network thread. The request message and data message (if any) are placed on their position on the message buffers. As a consequence of the notification, Tyche processes the request message and fetches the corresponding data message in case of a write request. Then a Linux kernel I/O request is issued to the local block device. FIGS. 5 and 6 summarize these receive paths for the network and block layers, respectively.

Figure 7:
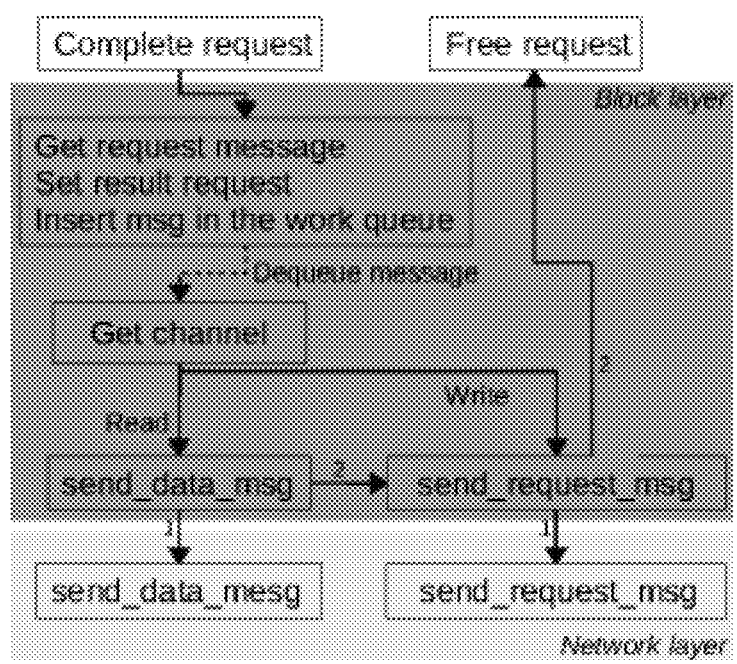
FIG. 7 shows an overview of a completion path in a target in one implementation of example of Tyche.

In one embodiment, the target may use a work queue to send completions back to the initiator. Local I/O completions may run in an interrupt context which is not able to perform actions that can block such as sending/receiving network messages. For this reason, the local I/O completion may schedule a work queue task that executes the required operations. FIG. 7 depicts this completion path, and the network send path is shown in FIG. 4.

Figure 8:
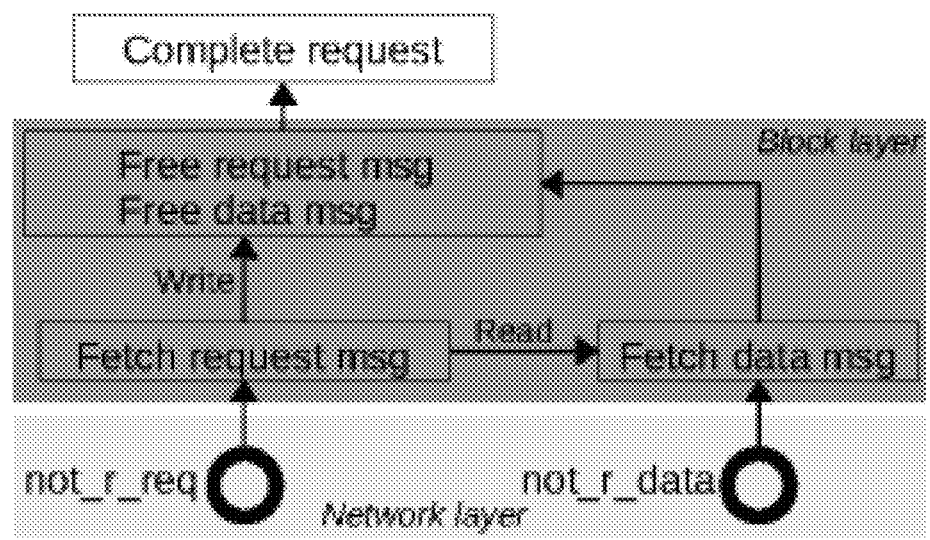
FIG. 8 shows an overview of a receive path in an initiator in one implementation of Tyche.

At the initiator, when a completion arrives, the receiving tasks are run, but now, the corresponding I/O request is completed. FIG. 8 depicts an exemplary embodiment of the receive path of the block layer at the initiator. FIG. 5 shows an exemplary embodiment of the network receive path.

Storage-Specific Network Protocol

In one exemplary embodiment, the header of packets within Tyche includes information to facilitate communication between the network and block layers, to allow several channels per NIC, to provide end-to-end flow control, and to allow out-of-order transfer and delivery of packets over multiple links or different network paths. For each packet, the header may include the number of the channel, the local position in the transmission ring that also denotes the position on the remote receive ring, the position of its message on the corresponding message buffer, and positive and negative acknowledgments. For data packets, the header may also include the number of pages that comprises the data packet, the position of these pages on the data message, and the total number of pages of the data message. By using the same position on the transmission and receive rings, Tyche can reduce packet processing overhead in the receive path. By including its position in the buffer for each message, upon its arrival, the corresponding message can be placed in its final position, thus avoiding copying from the network layer to the block layers.

Tyche has been designed to address, among other things, (1) memory management overhead, (2) synchronization, (3) NUMA affinity, (4) many cores accessing a single NIC, (5) latency for a small I/O request, (6) batching small requests, (7) elasticity, and (8) fault tolerance. The features of Tyche that addresses each of these issues will be described in greater detail below.

Memory Management

As noted above, in one embodiment of Tyche, each channel has pre-allocated buffers to reduce memory management overhead when receiving/sending messages. At the target, each channel may also have pre-allocated pages that are used for sending and receiving data messages as well as for issuing regular I/O requests to the local storage device. Network protocols over Ethernet involve a copy of data in the receive path from NIC buffers to the actual data location. The reason is that arriving data is placed in the physical pages belonging to the NIC's receive ring, however, this data should be placed eventually in the pages of the corresponding request. The copy of data should occur in the target for write requests and in the initiator for reads.

For write requests, Tyche avoids the overhead of the memory copy from NIC buffers to Tyche pages by interchanging the pages. On the arrival of a data packet, the target interchanges pages between the NIC receive ring and the data buffers. For reads, this interchange technique cannot be applied, and the initiator requires a single copy. When a read is sent over the network, the layer that initially issued the request expects specific non-sequential physical pages (struct page objects in the Linux kernel) to be filled with the received data. Therefore, exchanging pages does not work, and a memory copy is required.

Synchronization

Tyche minimizes the synchronization when accessing shared structures by reducing the number of spin-locks used and by using atomic operations. For a write request, FIG. 2 shows with an "L" the locks of the end-to-end I/O path in the inline mode. A read request may use the same locks, since the difference with a write is that data is sent as a completion from the target to the initiator. For each lock, Table II below shows the locks in the Tyche end-to-end I/O path for the inline and queue modes. S, R, I, and T stand for Send, Receive, Initiator, and Target, respectively. For each lock, Table II includes the name, layer, path and host in which the lock is used, the data structure or task protected, and the steps in FIG. 2 in which they are held.

TABLE II

| Name | Layer | Path | Host | Data structure/Task | Held in steps (from FIG. 2) |
|---|---|---|---|---|---|
| Mes | Block | S, R | I | Message buffers | 1, 17 |
| NIC | Network Driver | S | I, T | NIC transmission ring | 3, 5, 14 |
| Not | Network | R | I, T | One per notification ring | 7, 9, 10, 11, 16, 17 |
| Work | Block | S | T | Work queue | 12, 13 |
| Pos | Network | S | I, T | To send positive ack | Not included |
| Neg | Network | S | I, T | To send negative ack | Not included |
| Que | Block | S | I | Request queue (Queue mode) | Not included |

In one exemplary embodiment, several threads in the send path can submit requests concurrently, and Tyche can be configured to synchronize access to all buffers, rings, and the NIC itself. In one embodiment, in the initiator, the block layer uses a spin-lock (Mes in Table II) for exclusive access to the buffer messages (Steps 1 and 17 in FIG. 2). The network layer controls accesses to transmission rings by atomic operations. Per NIC, an additional spin-lock (NIC in Table II) may be used to transmit the packets through the network device (steps 3, 5 and 14 in FIG. 2). The queue mode may use an additional spin-lock (Que in Table II) to control the access to the request queue.

In the receive path, network threads may concurrently poll NICs for reception of events, but, to reduce synchronization, a single thread may process pending events and clean up the receive rings. An atomic operation may be used to control the access to these two functions. The access to the notification rings may be controlled by a spin-lock (Not in Table II).

In one embodiment, when overlapping messages are processed concurrently, a per-buffer lock may be required to avoid concurrent remapping of a single buffer. This lock can be defined as an atomic operation, and it may need to be acquired every time a message is processed (note that a message is normally processed just once). To avoid synchronization, each packet may already be assigned by the sender its position in the receiving ring. The three pointers used for controlling the receiving ring may be updated by atomic operations. The work queue may also be used to send completions back from the target to the initiator and may require a spin-lock (Work in Table II) to ensure exclusive access.

For positive and negative acknowledgments, Tyche may use a per-channel lock (Pos and Neg, respectively, in Table II) for ensuring that only a single thread sends the corresponding packet. Because several threads can simultaneously set/get notifications, each notification ring may include two spin-locks, one for the head and one for the tail.

NUMA Affinity

Figure 9:
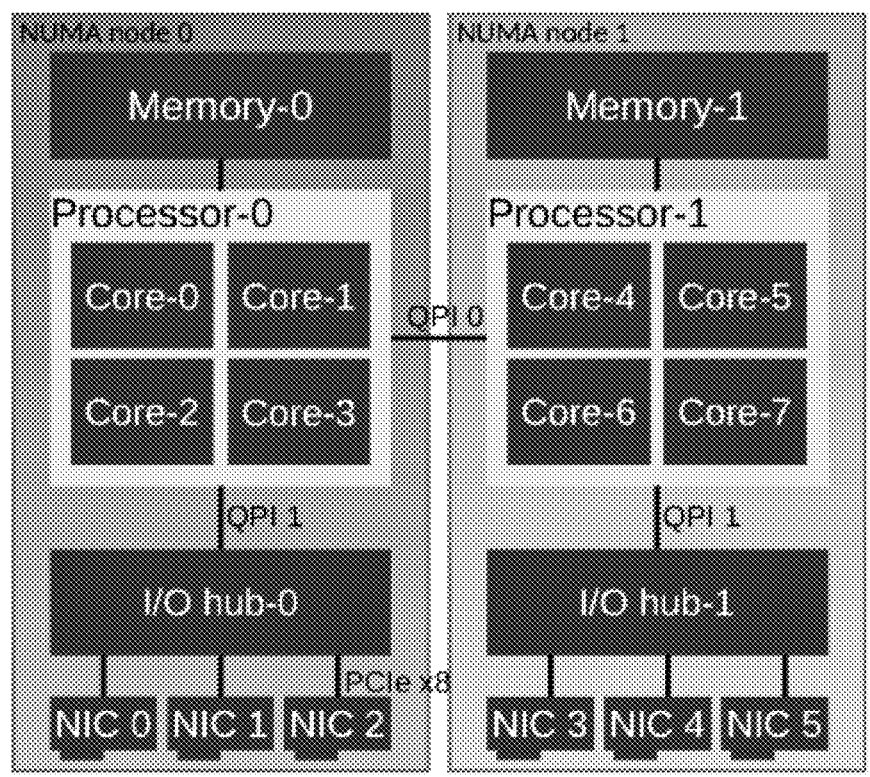
FIG. 9 shows internal data paths between NUMA servers in one implementation of Tyche.

For scalability purposes, modern servers employ non-uniform memory access (NUMA) architectures, such as the one depicted in FIG. 9. In such architectures, there is significant difference in performance when accessing local or remote memory. Consequently, affinity among different resources is an important consideration to achieve high throughput in a NUMA architecture. Otherwise, performance can be significantly downgraded. In the I/O path, there are four resources related to NUMA affinity: application buffers, protocol data structures, kernel (I/O and NIC) data buffers, and NIC location in server sockets. The placement of threads plays a role as well, and it affects application threads, protocol threads, work queues and interrupt handlers.

In one exemplary embodiment, Tyche orchestrates affinity of memory and threads by considering the system topology and the location of NICs. It creates a communication channel per NIC, and associates resources exclusively with a single channel. Each channel may allocate memory for all purposes and pin its threads to the same NUMA node where its NIC is attached. For instance, in the architecture shown in FIG. 9, a channel mapped to NIC-0 may use memory in Memory-0 and run its threads in cores within Processor-0. The NIC driver may use per NIC data structures: a transmission ring and two receive rings. Tyche may force the allocation of these rings in the same node where the NIC is attached as well, making them part of the NIC channel.

In one exemplary embodiment, Tyche may implement a NUMA-aware work queue because in the Linux kernel it may not be possible to apply affinity during assignment of tasks to work queues. The Tyche work queue may launch a thread per core that is pinned in its corresponding core. The target may submit completion messages to the work queue by using its NUMA information. Conceptually, there may be one work queue per channel.

Figure 10:
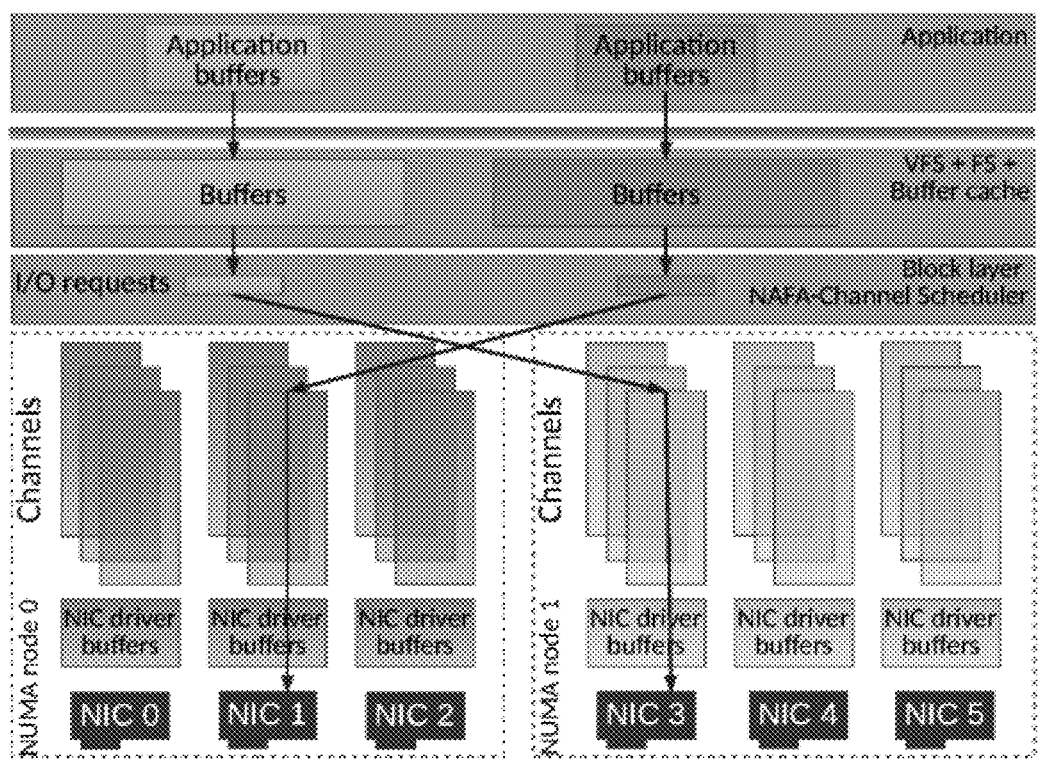
FIG. 10 shows an affinity-aware scheduler selecting a channel for two I/O requests in one implementation of Tyche.

FIG. 10 illustrates an affinity-aware scheduler selecting a channel for two I/O requests in an exemplary embodiment of a Tyche system with six NICs, three per NUMA node, and three channels per NIC, and the scheduling of two I/O requests. To deal with affinity of I/O request buffers that are allocated before the request is passed, an "assignment" approach may be used. Tyche may allow requests to arrive with pre-allocated buffers, anywhere in the system. Then, Tyche may dynamically detect where buffers are allocated, identify a NIC that is located in the same NUMA node as the request buffers, and assign the request to a channel that uses this NIC. For this purpose, Tyche may implement a scheduler to select a channel through which the next I/O request will be issued. If there are several channels on this node, Tyche may use a fairness metric, by default equal kBs to each channel, to select one of them. This affinity-based scheduling provides an advantage over a simple round-robin approach that does not consider buffer location and merely distributes I/O requests to channels in a round-robin manner.

Many Cores Accessing a Single Network

The increasing number of cores in modern servers also increases contention when threads from multiple cores access a single network link. In one exemplary embodiment, in the send path, the initiator uses the queue mode, where multiple threads place requests in a queue, and Tyche controls the number of threads that can access each link. At the target, work queues send completions back, limiting the number of contexts that interact with each NIC by using one work queue thread per physical core. In the receive path, Tyche may use one thread per NIC to process incoming data. Measurements show that one core can sustain higher network throughput than a single 10 GigE NIC, and therefore does not limit the maximum throughput.

Reducing Latency for Small I/O Requests

There are two fundamental limitations to achieving high IOPS (input/output operations per second) for small I/O requests: context switches impose significant CPU overhead while network packet processing dominates over link throughput. A context switch refers to the switching of the CPU from one process or thread to another.

Figure 11:
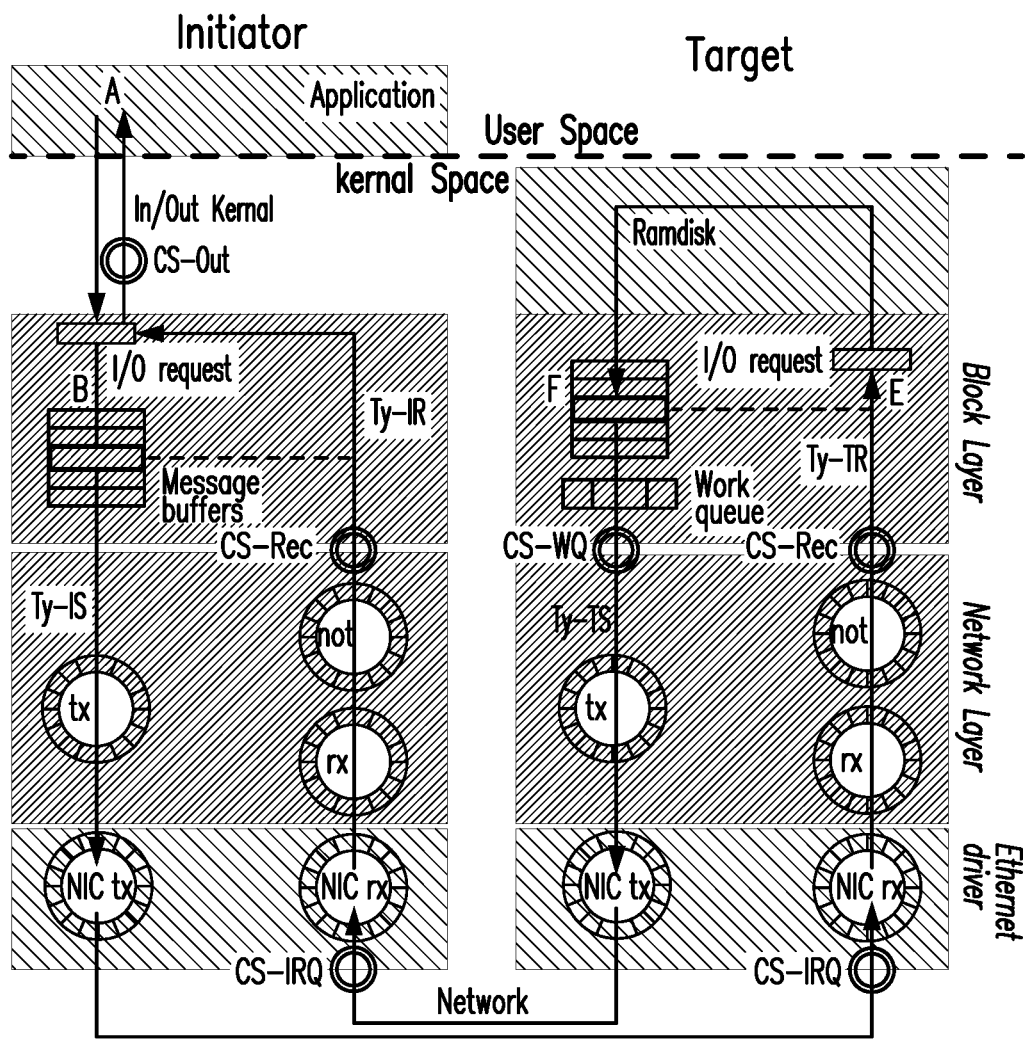
FIG. 11 shows an end-to-end I/O path in one implementation of Tyche.

FIG. 11 shows an end-to-end I/O path for a request message, including components and their associated context switches. The arrows shown in FIG. 11 trace the end-to-end path of the request message, with the circles showing the context switches. In the exemplary embodiment shown in the figure, serving a request involves at least six context switches. These switches include two on the receive path, one at the initiator and one at the target, marked as CS-Rec in FIG. 11, due to the switch between the threads of the network and block layers. At least one context switch occurs between these threads. One context switch may be located at the target send path, marked as CS-WQ in FIG. 11, due to the work queue. Two context switches, one on each side, marked as CS-IRQ in FIG. 11, may be used because of the NIC interrupts that just wake up the network thread. For small requests, two context switches are used, but for large requests, more may be required because the number of data packets sent/received depends on the request size. Finally, one context switch, labeled CS-Out in FIG. 11, may be used to complete the request. In one exemplary embodiment, after issuing a request, the application thread is blocked waiting for its completion. To complete a request, Tyche may run a function that ends up waking the application thread and doing a context switch. To avoid this context switch, layers above Tyche could be modified. For small requests, Tyche may work in the inline mode, which outperforms the queue mode. So at the initiator, requests may be issued with no context switch.

A variant of the base protocol, called Tyche-NoCS, may reduce the number of context switches by avoiding context switches on the receive path and those that are due to the work queue. This design is particularly effective for low degrees of I/O concurrency.

To avoid the context switch between the network and block threads (CS-Rec in FIG. 11), a single thread may be used that runs the through the entire receive path. The network thread may processes a packet, composes the message, and check whether any data message related to the one just composed has arrived. When all the messages (request message and data message, if any) have been received, the network thread may run the block layer tasks through a callback function. To avoid blocking this thread, Tyche may also use callback functions to check whether all the messages that compose an I/O request have been received. In addition, the notification rings that communicate both threads may not be used. In this way, Tyche can reduce overhead by avoiding the notification rings and, for instance, the lock to ensure exclusive access to the notification rings.

In another exemplary embodiment, Tyche may also eliminate the context switch in the target send path due to the work queue (CS-WQ in FIG. 11). Tyche-NoCS attempts to send the response to the initiator from the completion context of the local I/O. If it succeeds, there will be no context switch. But if the operation needs to block, which is not allowed in the completion context, it will fall back to the work queue of the base version. Note that the completion context will block, if, for instance, there is no space in the transmission ring. Avoiding the work queue results in avoiding the management associated, for instance, the lock that is required to insert/dequeue tasks into/from the work queue.

Adaptive Batching

For high concurrency of small requests, Tyche may implement adaptive batching to improve link utilization. In one embodiment, Tyche implements a dynamic technique that varies the degree of batching without increasing I/O overhead and response time. Tyche may include two new kinds of messages, called batch request messages and batch data messages. A batch request message is a single network message that includes several I/O requests, reads or writes, issued by the same or different threads. When a batch request message is received, the target issues to the local device a regular I/O request per request included in the batch message. A batch data message is a data message that sends data of several I/O requests.

Figure 12:
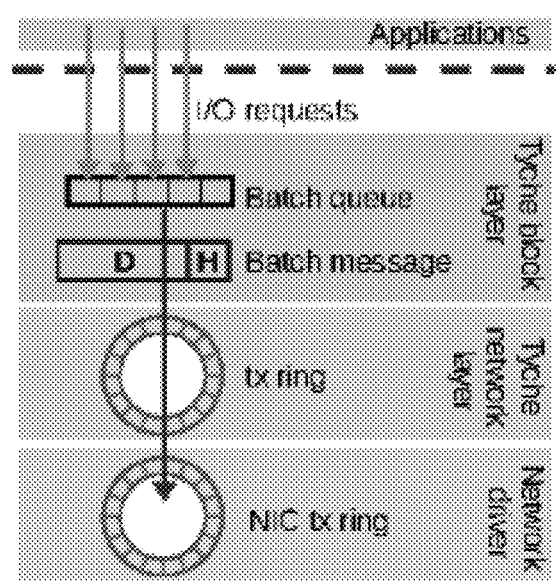
FIG. 12 shows an initiator send path with batching in one implementation of Tyche.

Completions may be sent as batch messages as well. The target may send the completion message when all the requests associated with the batch message are completed. In one exemplary embodiment, the batching mechanism used by Tyche is built around a batch queue introduced in the send path of the inline mode. FIG. 12 depicts the initiator with the batch mechanism (to simplify the figure, message buffers are omitted). In one embodiment, at the initiator, each I/O request is inserted into the batch queue. Then, batch threads dequeue requests and include them in a batch request message and in a batch data message.

The batching approach used in this embodiment decides whether to wait for new requests or send the batch message immediately. Tyche may use a parameter, the current batch level (current_batch_level), to determine the number of requests to include in a batch message. Tyche may send a batch message when it has current_batch_level requests. Tyche may then dynamically calculate current_batch_level based on the link throughput achieved. If by increasing or decreasing the batch_level compared to the current value results in increased throughput, Tyche will continue moving in the same direction.

In one exemplary embodiment, the value of current_batch_level varies between 1 and max_batch_level. Where max_batch_level corresponds to the maximum number of requests that a batch message can carry. In one implementation, to compute the value of current_batch_level, the Tyche batch mechanism may calculate two values: (1) the throughput achieved (Xput and Xput_p) in the last and previous intervals by using the number of I/O requests completed and their size; and (2) the average number of outstanding I/O requests (a_out_r) in the batch queue during the last interval.

Tyche may then calculate the improvement in throughput of the last interval over the previous interval, and set current_batch_level as follows: if the improvement is larger than 3% the new value of current_batch_level will be increased to (current_batch_level+min(a_out_r,max_ batch_level))/2; if the improvement is smaller than −3%, the value of current_batch_level will be reduced to: (1+min (a_out_r,current_batch_level))/2; otherwise, no change is made to the batch level. To avoid delaying batch messages too long, Tyche may use a maximum amount of time (max_delay) that the first request of a batch message may be delayed. In one implementation, a batch message will be sent if current_batch_level is reached or max_delay expires.

Finally, Tyche may avoid the case where the batch_level remains unmodified because throughput is stable, although there is potential for better link utilization. For this reason, if after ten consecutive intervals there are no changes, Tyche may compare the throughput of current_batch_level to the throughput of current_batch_level−1 and current_batch_level+1. If for one of these new values, there is an improvement of at least 3%, Tyche may start adjusting current_batch_level again.

Elasticity

Elasticity refers to the ability to automatically remove or add resources according to the current workload with the aim of efficiently using resources. Because a server could easily have 64 cores and multiple 10 Gbit/s Ethernet links, any network storage protocol should consider elasticity. Tyche may implement various methods to deal with elasticity. In one method, Tyche dynamically adds or removes NICs to the system without rebooting the system. In one implementation, ioctl commands may be used to carry out this process from user space. When adding a new NIC, new channels could be opened for it. Whereas when removing a NIC, channels opened and mapped to this NIC will be closed and its resources will be released.

Another method that can be used by Tyche, called Elas, is a dynamic method applied by the initiator. This dynamic method decides whether or not to use NICs already connected to the system depending on the throughput achieved for the current workload. This method ensures proper utilization of network throughput from multiple and diverse application workloads running on the server. The NICs not used by Tyche could be used by other protocols.

Because Tyche maps channels to NICs, Elas determines whether to use a channel based on the throughput achieved. For each channel, Elas keeps its state, that can be active or inactive. When a channel is active, it is used for sending requests to the target. When a channel is inactive, Tyche does not send any message through it. The policy applied by Elas also takes into account NUMA affinity.

For example, if the initiator has two NUMA nodes, on each NUMA node there are n NICs, and there is one channel per NIC, each NIC could provide a maximum throughput of T MB/s (the maximum throughput achieved per NUMA node is n×T). Initially, all the channels are active, and Tyche can use them. At a predetermined time interval, for example, every 5 seconds, Elas applies the following policy to decide whether a channel should be kept active or not:

If, for a NUMA node with n channels-NICs active, the throughput achieved is less than 75% of the maximum throughput that n−1 channels-NICs could provide, one channel is turned off, and the corresponding NIC is not used.

If, for a NUMA node with p channels-NICs active, the throughput achieved is more than 75% of the maximum throughput that these NICs could provide, a new channel is turned on. If the NUMA node does not have more channels available (all the channels mapped to NICs on this NUMA node are already active), and the other NUMA node has channels available (because they are inactive), the NUMA node achieving the maximum throughput will borrow one of these channels, and it will be use n+1 channels-NICs.

In one embodiment, Tyche may keep at least one channel active on the system that is allocated at the NUMA node 0, and may use a NIC attached to the same node. When, for all the NUMA nodes, Tyche achieves 75% or more of the maximum throughput that all their NICs could provide, the mechanism makes nothing.

Fault Tolerance

In one exemplary embodiment, Tyche deals with fault tolerance by checking the receive path. The fault checking process performed may depend on the host. In one implementation, the target closes a channel after two hours without receiving any message through it. The target receives messages through a channel, issues the corresponding I/O requests to the local device, and sends the completions back to the initiator through the same channel. Therefore, when the target receives no messages through a channel for a predetermined period of time, it assumes that the channel is not valid anymore, consequently it closes the channel and releases its resources.

At the initiator, Tyche may initiate a fault checking process, when, during a predetermined time interval, a channel has received no completion messages although it has pending I/O requests to be completed. The duration of the time interval may be set, for example, as the double time of the average round trip time computed in the last second.

In this case, Tyche checks whether the NIC associated to the channel is on, and whether messages arrive to the target through the channel. There are three options, the best one is that everything is working and the completion messages are just delayed, so Tyche does nothing. The second option is that the target closed the channel in this case the initiator starts the process to re-open the channel, and then re-sends the pending messages. Since the initiator also keeps messages alive (explained below), this second option is very unlikely. The last and worst option is that the initiator cannot reach the target because a NIC (from the initiator or the target) or the link is down, meaning that it is not possible to use this channel to communicate with the target anymore. In this case, if there is another channel-NIC that communicates with the target, Tyche will re-send all the I/O requests pending through this second channel. However, if there is no other channel to reach the target, Tyche will create a log of the problem, as nothing further can be done. When a re-transmission is done through the same channel or a different one, the initiator sends the requests in the same order they were received.

In addition to this process, the initiator may send a keep alive message at a predetermined interval, for example, every second, to confirm that the channel is open and the NICs and links are on. This message forces the target to keep open the channel even when no request messages are received. The target will send this keep alive message back to the initiator, so both initiator and target know that the channel, network link, and devices are working properly.

Testing of Tyche Implementations

This section describes an implementation of Tyche that has been built and tested using the Linux kernel 2.6.32. NBD (Network Block Device), a popular software-only solution for accessing remote storage, and is used as a baseline for comparison to the Tyche implementation. NBD can only use one NIC per remote storage device. For evaluation purposes, and as an intermediate design point, a version of Tyche that uses TCP/IP has also been implemented. In this version, called TSockets, Tyche creates a socket per channel, and communicates with the remote node through the socket. TSockets uses all available NICs by creating a connection per NIC.

This Tyche platform consists of two systems (initiator and target) connected back-to-back with multiple NICs. Both nodes have two quad-core, Intel® Xeon® E5520 CPUs running at 2.7 GHz. The operating system is the 64-bit version of CentOS 6.3 testing with Linux kernel version 2.6.32. Each node has six Myricom 10 G-PCIE-8A-C cards. Each card is capable of about 10 Gbits/s throughput in each direction for a full-duplex throughput of about 120 Gbits/s. The target node is equipped with 48 GB DDR-III DRAM and the initiator with 12 GB. The target uses 12 GB as RAM and 36 GB as ramdisk. Note that ramdisk is used only for avoiding the overhead of the storage devices, since the focus of the testing is on the network path.

To understand the basic aspects of this approach, we evaluate its main features with two micro-benchmarks zmIO and FIO. zmIO is an in-house micro-benchmark that uses the asynchronous I/O API of the Linux kernel to issue concurrent I/Os at low CPU utilization. FIO is a flexible workload generator. In addition, the impact of Tyche has been analyzed with the following applications: IOR, BLAST, Psearchy, and HBase.

IOR emulates various checkpointing patterns that appear in the high performance computing domain. IOR uses MPI (message passing interface) and typically exhibits moderate user time, whereas the I/O issued by several concurrent MPI processes results in significant I/O wait time.

BLAST is an application from the domain of comparative genomics. Tyche has been tested by running multiple instances of BLAST each with a separate set of queries on a separate database, using a random query sequences of 5 kB, which is a common case in proteome/genome homology searches. BLAST is I/O intensive and the execution time is primarily dominated by user time. BLAST is often used for Nucleotide-Nucleotide sequence similarity search.

Psearchy is a file indexing application. It can be run using multiple processes where each process picks files from a shared queue of file names. For purposes of testing Tyche, the original Psearchy has been modified to use block-oriented reads instead of character-oriented reads to improve I/O throughput.

HBase is a NoSQL data store that is part of the Hadoop framework. The YCSB (Yahoo! Cloud Serving Benchmark) has been used to test Tyche by first building a database using the YCSB load generator with a workload that makes only insert operations. A workload that does 100% read is then run, as well as a workload that makes 100% insert operations, but without the load phase.

Baseline Performance

Figure 13:
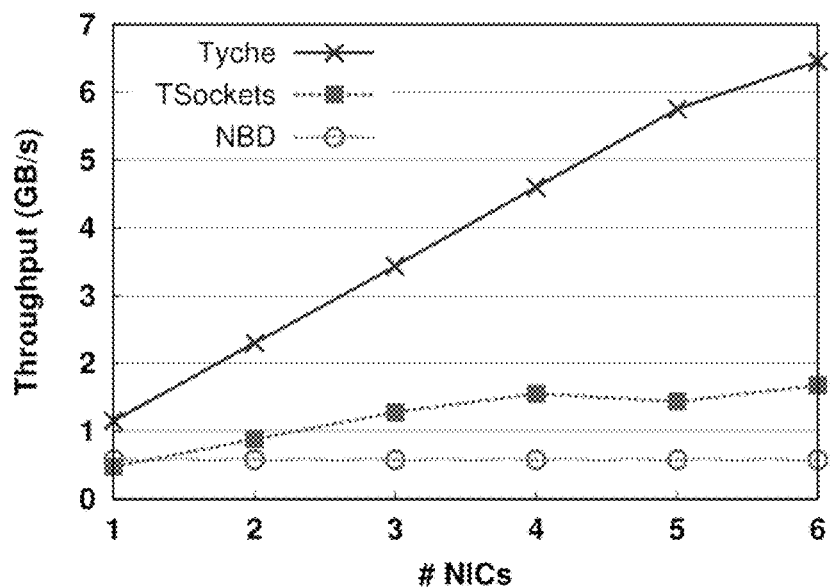
FIG. 13 shows a graph of throughput for read requests and write requests in one implementation of Tyche.
Figure 13:
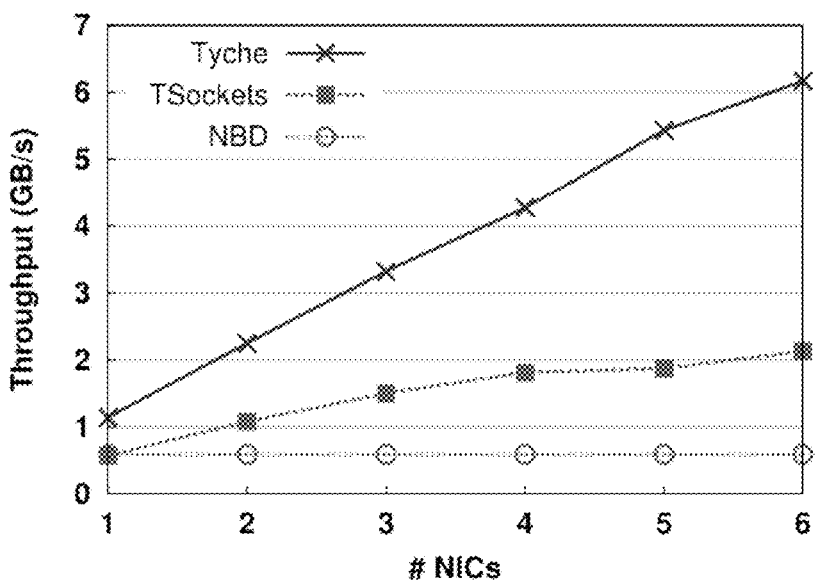

FIG. 13 shows the results of an analysis of baseline performance with zmIO, which was run with sequential reads and writes, synchronous operations, direct I/O, 32 threads submitting requests and two outstanding requests per thread, a request size of 1 MB, and a run time of 60 seconds. For this test, the remote storage device is accessed in a raw manner (there is no file system). The test is run for 1 to 6 NICs, with one channel per NIC.

FIG. 13 includes two graphs showing the throughput, in Gigabits per second, achieved by Tyche, TSockets, and NBD for (a) read requests and (b) write requests, with zmIO, for sequential reads and writes, and a request size of 1 MB. For reads, when 1, 2, and 3 NICs are used, Tyche achieves the maximum throughput of the NICs. When using 4, 5, and 6 NICs, Tyche provides a bit lower throughput, 4.3 GB/s, 5.4 GB/s, and 6.2 GB/s, respectively. This is due to the overhead of copying pages in the initiator that becomes noticeable at higher rates. For writes, Tyche achieves the maximum throughput provided by the NICs except for 6 NICs, that it obtains 6.5 GB/s. With 6 NICs, when running this benchmark, the initiator is almost a 100% CPU utilization. TSockets achieves a throughput of 2.1 GB/s and 1.7 GB/s for reads and writes, respectively. NBD obtains a throughput of 609 MB/s because it is only able to use a single NIC.

Figure 14:
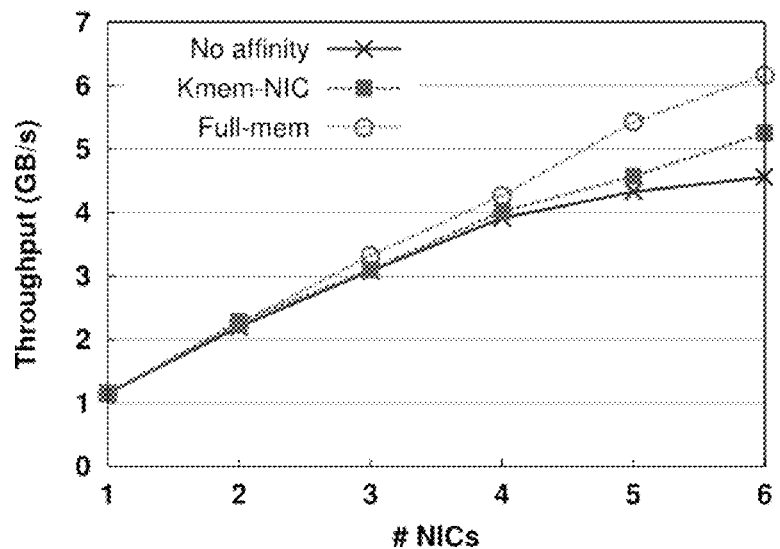
FIG. 14 shows graphs of throughput for read requests and write requests, depending on affinity, in one implementation of Tyche.
Figure 14:
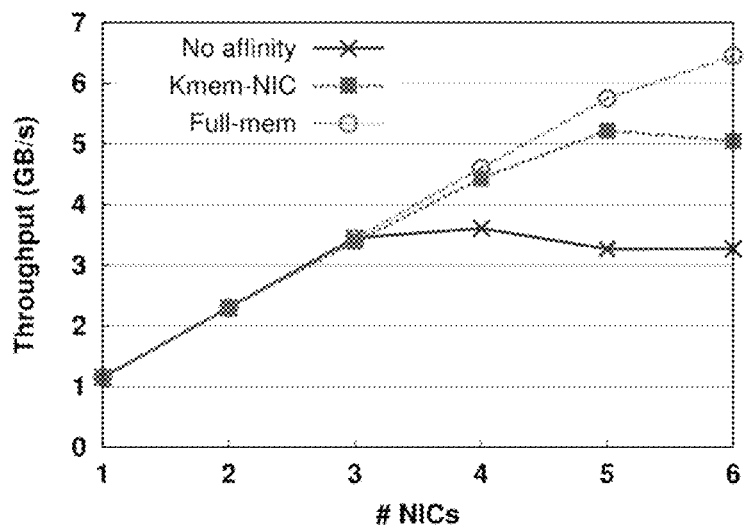

As shown, Tyche throughput scales with the number of NICs, and Tyche achieves between 82% and 92% of NIC throughput in the tested implementation. NBD is only able to use a single link. TSockets does not scale with the number of NICs, and by using 6 NICs, it is able to saturate at most 2 NICs. Tyche achieves 6.5 GB/s, compared to 2.1 GB/s and 609 MB/s for TSockets and NBD respectively, so Tyche has about 10x the throughput of NBD and more than 3× the throughput of TSockets. As shown in FIG. 14, TSockets is more than 3× better than NBD, which shows that TCP/IP is responsible only for part of the overhead when accessing remote storage.

Dealing with NUMA

FIG. 14 includes two graphs showing the throughput, in GB/s, achieved by Tyche depending on the affinity, with zmIO for 32 threads, sequential reads, and writes and 1 MB request size for (a) read requests, and (b) write requests. To analyze the impact of the NUMA architecture three configurations of Tyche were considered: no affinity ("No affinity" in FIG. 14); only Kmem-NIC affinity (only Tyche applies affinity); and full-mem affinity (both application and Tyche applies NUMA affinity).

FIG. 14 depicts throughput achieved by Tyche depending on placement. Up to 3 NICs there is almost no difference among the three configurations. However, for 4 or more NICs, results vary significantly. Maximum throughput is only achieved when all types of affinity are considered, and both the send and receive path use pages that are in the same NUMA node where the NIC is located. With Kmem-NIC affinity, throughput is higher than without placement, but, for writes the difference between no affinity and Kmem-NIC affinity is higher than for reads. The reason is that for writes this affinity has impact on the receive path, whereas for reads, the impact is more on the send path due to the copy made at the initiator receive path.

When comparing the results of full-mem placement to no affinity at all, Tyche improves the performance up to 35% and 97% for reads and writes, respectively. If the comparison is with the Kmem-NIC affinity, the improvement is up to 15% and 54% for reads and writes, respectively.

Results show that Tyche achieves the maximum throughput only when the right placement is done. The Kmem-NIC placement is particularly important for writes due to the interchange of pages made between the NIC and the list of pages of Tyche, since the NIC uses these new pages for receiving the data. Therefore, when receiving write data, the Tyche protocol checks if the pages to interchange are in the same node, and the interchange is done only in this case. If the pages are allocated in different NUMA nodes, the protocol will copy the data from the NIC page to the Tyche page.

Receive Path Processing Requirements

Figure 15:
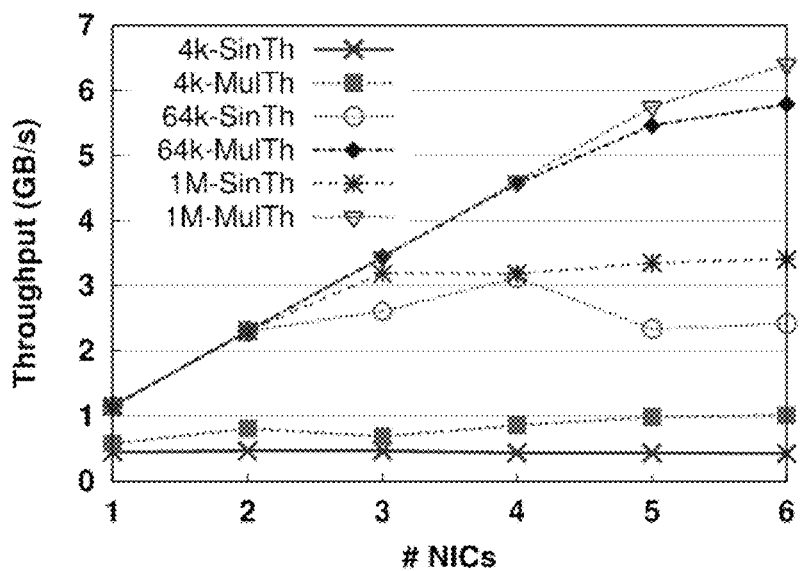
FIG. 15 shows graphs of throughput when a single network thread processes packets from all or when a thread per NIC is used in one implementation of Tyche.
Figure 15:
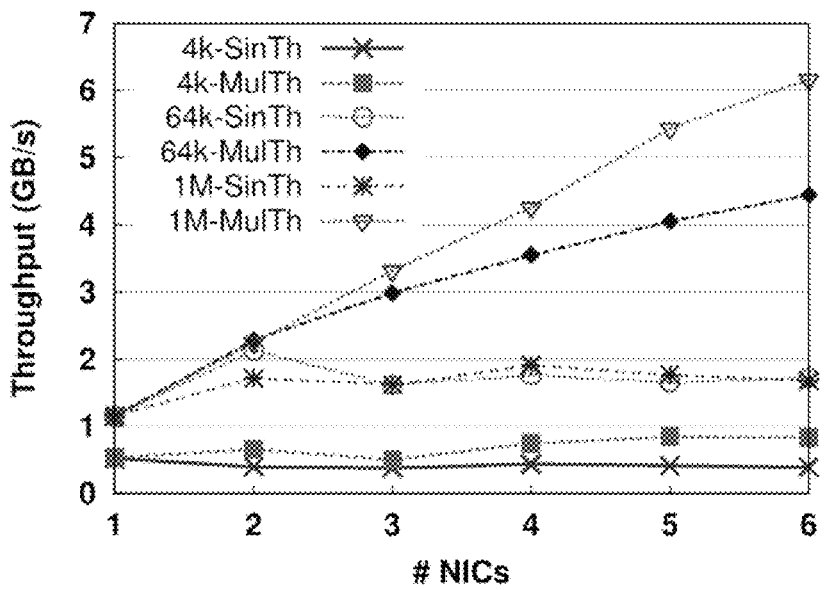

FIG. 15 includes two graphs showing throughput, in GB/s, obtained by Tyche when a single network thread processes packets from all NICs (SinTh) or when a thread per NIC is used (MulTh), with zmIO, sequential reads and writes, and 4 kB, 64 kB, and 1 MB request sizes, for (a) read requests and (b) write requests. Typically, receive-path processing is heavier than send-path processing in network protocols. To properly understand tradeoffs with today's CPUs and high speed links, the processing requirements of the Tyche receive path were examined. FIG. 15 depicts Tyche throughput when there is a single network thread for all NICs (curves with "X-SinTh", where X is the request size) and when there is a thread per NIC (curves with "X-MulTh"). In this test, zmIO was used with sequential reads and writes, synchronous operations, direct I/O, 32 threads issuing requests, 2 outstanding requests, and a run time of 60 s, using 4 kB, 16 kB, 64 kB, 128 kB, and 1 MB request sizes. In this implementation, Tyche uses affinity optimizations. FIG. 15 only shows results for 4 kB, 64 kB and 1 MB, since the other results are similar. As can be seen, a single thread can process requests for two NICs, so about 20 GBits/s. Therefore, using a thread per NIC, Tyche can achieve maximum throughput as well as reduce receive-path synchronization.

Efficiency of the Send Path at the Initiator Side

As mentioned, the Tyche initiator can operate in at least two different modes, including the inline mode and the queue mode. In the inline mode, there are many threads submitting requests but the system incurs no context switch overhead. In the queue mode, a context switch is used to avoid having many threads access a single NIC and incur the associated synchronization overhead.

Figure 16:
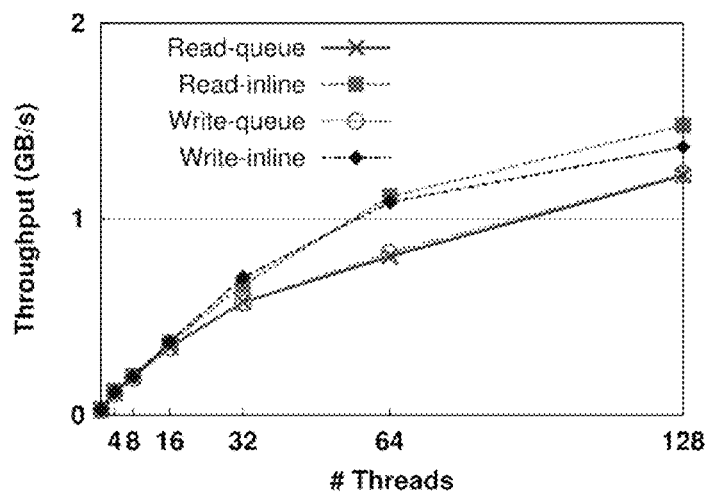
FIG. 16 shows graphs of throughput depending on the send path mode in one implementation of Tyche.
Figure 16:
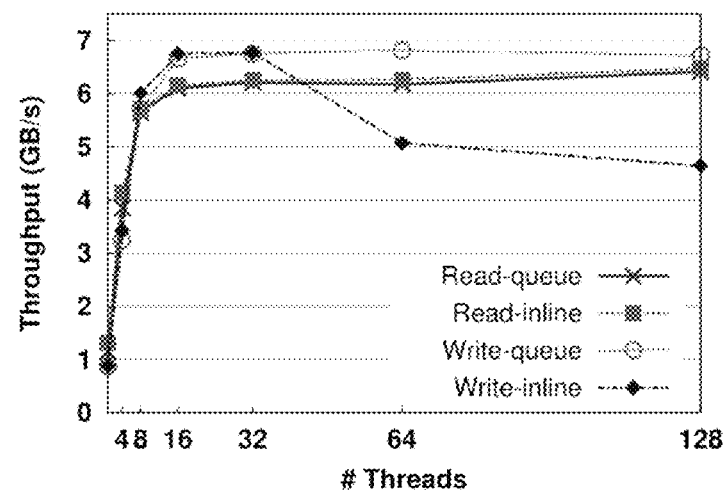

FIG. 16 depicts throughput achieved by Tyche as a function of the number of threads and the mode of the send path, for (a) 4 kB request size and (b) 512 kB request size. The results were obtained using FIO with sequential reads and writes, direct I/O, a 256 MB file size, request sizes of 4 kB and 512 kB, and a run time of 60 s. Tyche was run for 1-128 tasks, each one with its own file. XFS was used as file system. With this test, Tyche obtains its maximum throughput: 6.48 GB/s for reads with 128 tasks and the inline mode, and 6.81 GB/s for writes with 64 tasks and the queue mode.

For writes, with a request size of 4 kB, there is no difference between both modes up to 16 threads. However, for 32, 64, and 128 threads, the inline mode outperforms the queue one by up to 31%. For a request size of 512 kB, both modes achieve the same throughput up to 32 threads. For 64 and 128 threads, the throughput significantly drops by up to 31% for the inline mode, whereas, the queue mode achieves maximum throughput, due to the increased contention for the NIC lock. The queue mode pays the cost of a context switch but uses 18 Tyche threads for submitting packets (3 per NIC), and lock contention is reduced.

For reads, the inline mode outperforms the queue mode up to 27% (for a request size of 4 kB and 64 tasks), because the latter pays the overhead of a context switch when there is just a single thread submitting requests. The exception is for a 512 kB request size and 16 threads or more, in which case both modes achieve similar throughput. For large requests the throughput obtained depends more on the delay of the target than on the overhead at the initiator.

FIG. 16 shows that for reads both modes scale with the number of application threads. For writes, the queue mode scales with the number of threads, whereas the inline mode only scales for small request sizes.

Figure 17:
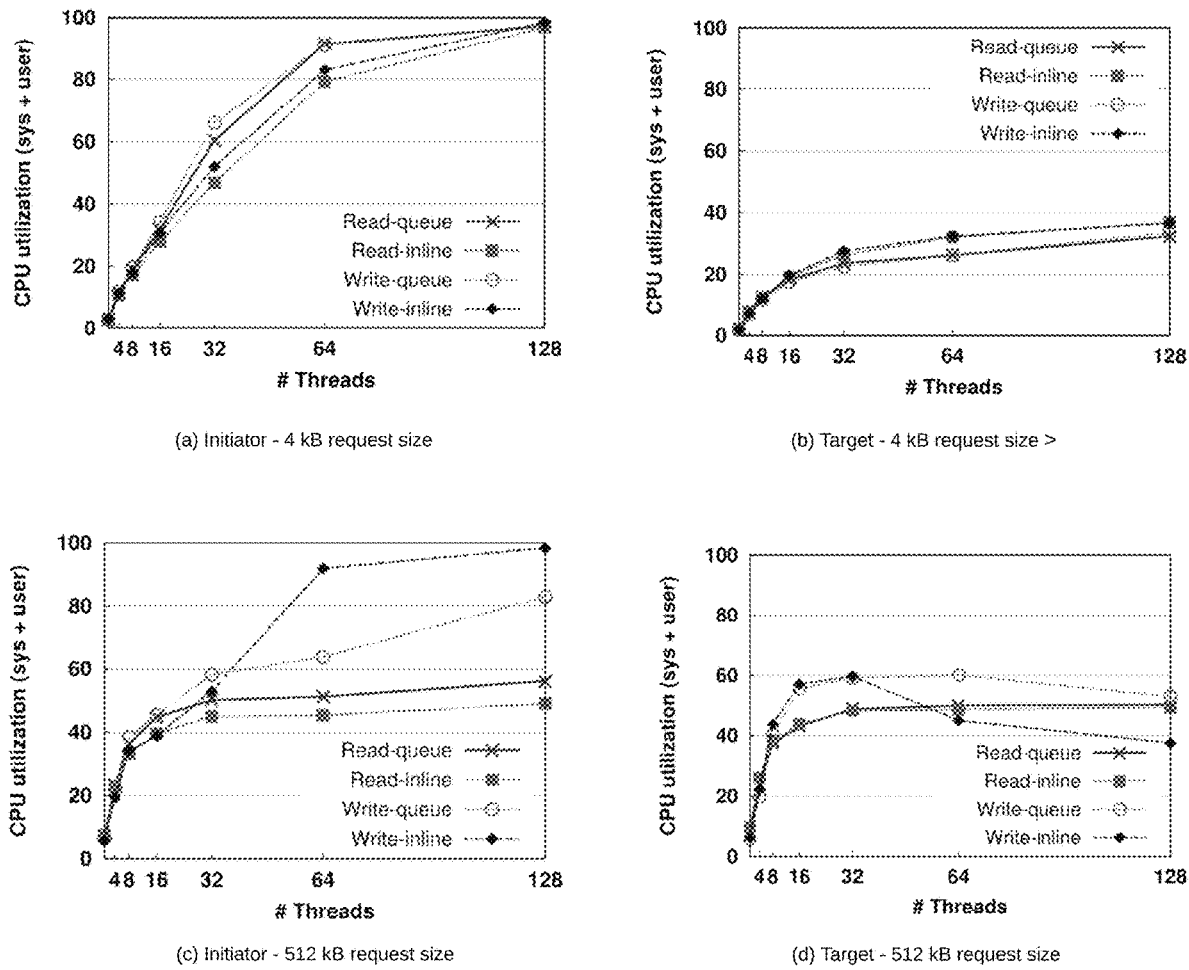
FIG. 17 shows graphs of CPU utilization depending on the send path mode in one implementation of Tyche.

FIG. 17 includes four graphs depicting the CPU utilization of Tyche, calculated as system time utilization plus user time utilization at the initiator and target sides for both modes, depending on the number of application threads and on the request size, (a) at the initiator with a 4 kB request size, (b) at the target with a 4 kB request size, (c) at the initiator with a 512 kB request size, and (d) at the target with a 512 kB request size.

At the initiator and with a request size of 4 kB, due to the context switch, the CPU utilization for the queue mode is higher by 29% and 15% for 32 and 64 threads respectively. However, at the target, the queue mode makes less processing, it drops up to 19%, because this mode achieves lower throughput.

When the request size is 512 kB, for reads, the initiator incurs higher processing, up to 31% in the queue mode, due to the context switch. At the target, both modes use almost the same CPU and the throughput achieved is similar. For writes, up to 32 threads the queue mode incurs more processing at the initiator side, up to 16% more, whereas, at the target, both modes have similar CPU utilization. For 64 and 128 threads, at the initiator, the inline mode makes up to 30% more processing than the queue mode, due to the synchronization overhead and lock contention. At the target, since the inline achieves lower throughput, its CPU utilization is also lower, up to 40%.

Latency Evaluation

The cost of the I/O path for a request was also analyzed. Table III summarizes the individual and cumulative overheads computed. Table IV presents overheads, in μs, and throughput, in MB/s, obtained by Tyche, for reads and writes of 4 kB, and 128 kB. The analysis used a single NIC connected to NUMA node 0, with a single channel opened on this NIC. The analysis also used FIO with direct I/O, random requests, and 60 s of runtime. The storage device was accessed in a raw manner (no file system).

TABLE III

| Name | Path | Description |
| --- | --- | --- |
| Total | A-B-E-B-A | Overhead, reported by the application, of serving the request measured as the time delay between the time the application issues the request until the request is completed. |
| Tyche | B-E-B | Overhead measured by Tyche as the time between the arrival of the request to its block layer until its completion. Effectively, this is the overhead of our protocol excluding the above layers. |
| Ty-IS | B-C | Overhead of the Tyche (Ty): send path at the initiator (IS) and target (TS) |

TABLE III-continued

| Name | Path | Description |
|---|---|---|
| Ty-TR | D-E | and receive path at the initiator (IR) and target (TR). |
| Ty-TS | F-G | |
| Ty-IR | H-B | |
| CS-WQ | | Cost of the context switch due to work queues. |
| CS-Rec | | Cost of the context switch between the network layer and block layer threads (includes context switches of both sides). |
| CS-IRQ | | Cost of the context switches done when a NIC's IRQ is raised. Measured as the time spent since the IRQ handler function executes the wake up function until the network thread starts its execution. |
| Ramdisk | E-F | Overhead of the ramdisk from submitting a bio until receiving its completion. Ramdisk is synchronous so, IO happens inline with no context switches. |
| In/Out kernel | A-B and B-A | Time needed by a request to arrive from the application to Tyche and time needed to complete the request from Tyche. This overhead is calculated (not measured) as the difference between total and Tyche overheads. |
| Network | C-D and G-H | Overhead of the network interface and the network link(s). This overhead is calculated (not measured) as the difference between Tyche overhead and the sum of Ty-IS, Ty-TR, Ty-TS, Ty-IR, CS-WQ, CS-Rec, CS-IRQ, and Ramdisk. It includes the overhead of the corresponding driver at the host, which however, is low compared to the rest of the host overheads. |

TABLE IV

| | | Read requests | | Write requests | |
|---|---|---|---|---|---|
| Overhead (µs) | | 4 kB | 128 kB | 4 kB | 128 kB |
| Software | In/Out kernel | 13.19 | 15.33 | 12.80 | 40.96 |
| | Ty-IS | 2.75 | 2.00 | 4.75 | 26.25 |
| | Ty-TR | 3.00 | 4.25 | 5.00 | 24.25 |
| | Ty-TS | 4.00 | 22.00 | 3.00 | 3.00 |
| | Ty-IR | 5.00 | 45.00 | 2.25 | 2.00 |
| | CS-WQ | 4.00 | 4.00 | 4.00 | 3.00 |
| | CS-Rec | 8.00 | 7.00 | 8.00 | 7.00 |
| | CS-IRQ | 8.15 | 30.54 | 8.13 | 37.90 |
| Hardware | Ramdisk | 1.00 | 30.75 | 1.00 | 31.00 |
| | Network | 24.60 | 60.21 | 24.87 | 63.35 |
| | Total | 73.69 | 221.08 | 73.80 | 238.71 |
| | Throughput (MB/s) | 52.50 | 565.00 | 52.50 | 523.25 |

There is a single application thread issuing I/O requests, and a single outstanding request. The analysis applied NUMA affinity by allocating memory and pinning all threads in the same NUMA node where the NIC is connected. In addition, as a baseline comparison between Tyche and NBD, Table V provides the total overhead, in µs, obtained by both protocols, for read and write requests, of 4 kB, and 128 kB, when running the same experiment.

TABLE V

| | Reads | | Writes | |
|---|---|---|---|---|
| | 4 kB | 128 kB | 4 kB | 128 kB |
| Tyche | 73.69 | 221.08 | 73.80 | 238.71 |
| NBD | 152.35 | 561.48 | 151.79 | 520.02 |

Table V shows that Tyche already reduces by more than 2× the total overhead achieved by NBD. However, the overhead introduced by Tyche for small requests may still be large and the main bottleneck when using fast storage devices. Message processing is an important source of per-I/O request overhead, being up to 65% of the total overhead. Considering only Tyche overheads (Ty-IS, Ty-TR, Ty-TS, Ty-IR, CS-WQ, CS-Rec, and CS-IRQ), for a 4 kB request, they represent 47%, taking into account the context switches done along the I/O path, and 20% without these context switches (without CS-WQ, CS-Rec, and CS-IRQ). Similar percentages are true for other request sizes. The In/Out kernel overhead is high, and depends not only on the request size but also on its type. For reads, this overhead has a larger impact in small requests, being a 17.9% of the total overhead for 4 kB requests, whereas for larger requests, the overhead is less important, being 6.9% for 128 kB requests.

For writes, its impact in the total overhead does not depend on the request size, and represents, on average, 17.0% of the total overhead. A significant component of this overhead is the overhead due to the context switch done to complete the request (CS-Out in FIG. 12). Overall, each context switch costs around 4 µs. For 4 kB requests, at Tyche level, the contest switches represent 27.5% of the total overhead. For 128 kB requests, they represent up to 20.0% of the total overhead.

A proposal to reduce context switches was also evaluated by implementing Tyche-NoCS based on a Tyche version that computes the overhead. Table VI provides the overhead breakdown, in µs, and throughput, in MB/s, for reads and writes. For this analysis, the same test was run under the same configuration. Total overhead was reduced by up to 27.6% for 4 kB reads, and throughput was improved by up to 39.1%. For 128 kB reads, overhead was reduced by up to 8.1%, and throughput was improved by up to 8.8%. For writes, this reduction was 30.8% and 5.2% for 4 kB and 128 kB requests, respectively, and throughput was improved by up to 44.8% and 5.5%, respectively.

TABLE VI

| | | Read requests | | Write requests | |
|---|---|---|---|---|---|
| Overhead (µs) | | 4 kB | 128 kB | 4 kB | 128 kB |
| Software | In/Out kernel | 11.38 | 14.77 | 12.11 | 42.36 |
| | Ty-IS | 2.00 | 2.00 | 3.00 | 23.75 |
| | Ty-TR | 1.00 | 2.50 | 2.00 | 20.25 |
| | Ty-TS | 3.00 | 20.00 | 1.00 | 2.00 |
| | Ty-IR | 1.00 | 40.00 | 0.00 | 0.25 |
| | CS-WQ | 0.00 | 0.00 | 0.00 | 0.00 |
| | CS-Rec | 0.00 | 0.00 | 0.00 | 0.00 |
| | CS-IRQ | 8.09 | 30.71 | 8.01 | 38.92 |

TABLE VI-continued

|  |  | Read requests | | Write requests | |
| --- | --- | --- | --- | --- | --- |
| Overhead (μs) | | 4 kB | 128 kB | 4 kB | 128 kB |
| Hardware | Ramdisk | 1.00 | 30.50 | 1.00 | 31.00 |
|  | Network | 25.91 | 62.79 | 23.99 | 67.83 |
|  | Total | 53.38 | 203.27 | 51.11 | 226.36 |
| Throughput (MB/s) | | 73.00 | 614.75 | 76.00 | 552.00 |

CS-Rec is reduced to zero, since no context switch is done on the receive path. Ty-TR and Ty-IR are significantly reduced as well. There are two reasons: (1) the notification rings are not used because a single thread runs the whole receive path, and (2) the locks to protect these rings are not required.

CS-WQ is reduced to zero, since the context switch due to the work queues is not performed. Ty-TS is also reduced, because the management of the work queue is avoided, for instance we avoid the lock to add a job to the work queue.

These results show, as expected, that avoiding locks also reduces overhead. However, only versions such as Tyche-NoCS, where a single thread executes one path exclusively, allow for the elimination of locks. When several threads can send/receive packets simultaneously, locks are needed to ensure exclusive access to the shared data structures.

The In/Out kernel overhead is also slightly reduced. In this case, there is no difference in the way the test is run. This reduction is due to the system caches, since there are fewer threads running and fewer context switches.

Elasticity Evaluation

The behavior of the elasticity method of Tyche was also analyzed with zmIO and different workloads. The test was run with direct I/O, asynchronous operations, sequential reads and sequential writes, 32 threads submitting requests, two outstanding requests, and using a raw device. To change the throughput achieved by Tyche, six different tests were run with different request sizes in a row, each one lasting 30 seconds. The request sizes tested were 4 kB, 16 kB, 64 kB and 1 MB, and the order of the tests was as follows: 4 kB, 16 kB, 1 MB, 64 kB, 4 kB and 1 MB.

Initially, 6 channels, one per NIC, are active, and Elas checks the Tyche throughput every 5 seconds. To run this test, Tyche applies affinity optimizations, and the minimum number of channels active will be two, one per each NUMA node.

Figure 18:
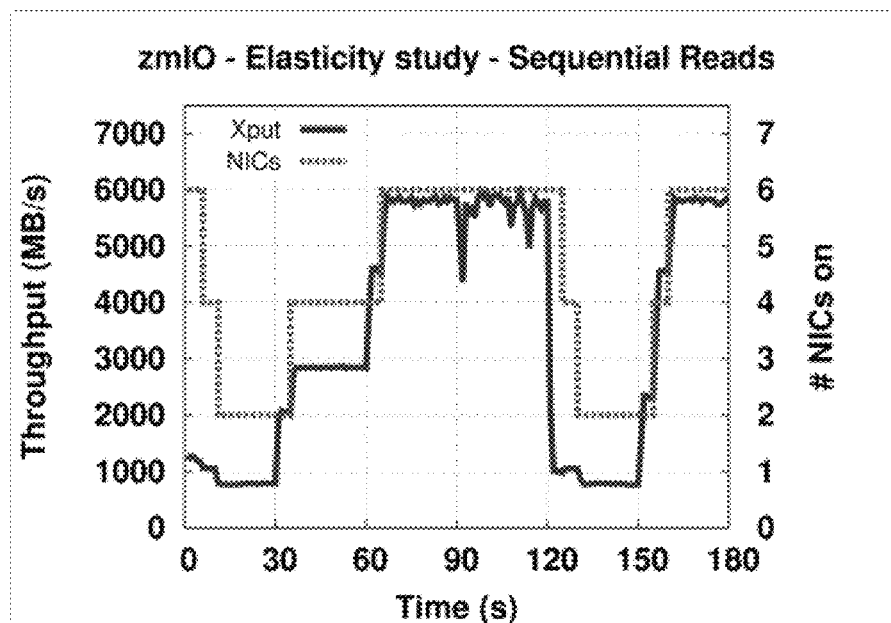
FIG. 18 shows graphs of elasticity of sequential reads and writes.
Figure 18:
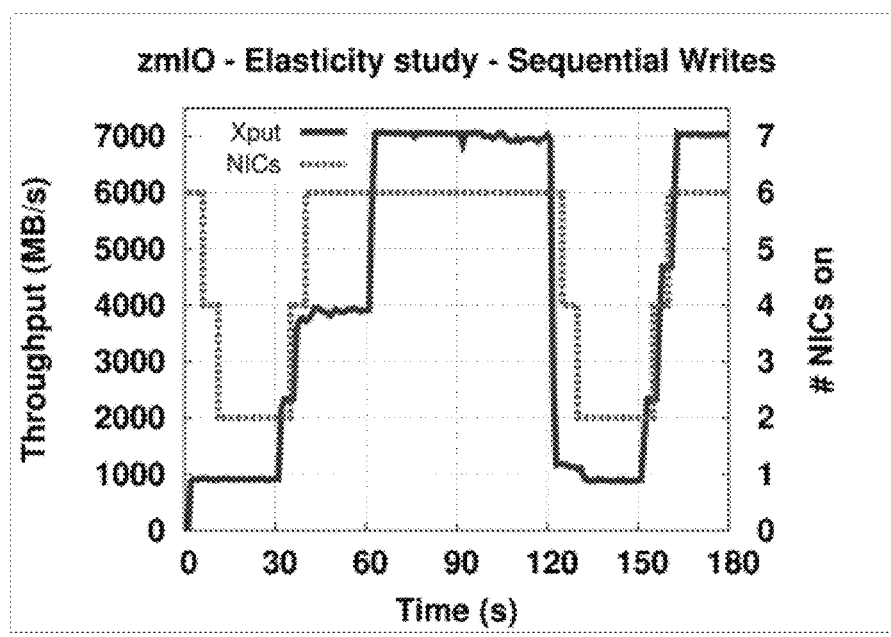

FIG. 18 presents the throughput in MB/s achieved by Tyche (solid curve plotted left y-axis), and the number of channels-NICs on during the execution of the tests (dotted curve right y-axis) for sequential (a) read requests and (b) write requests.

Initially, with a request size of 4 kB, the method turns off four channels, two per each NUMA node, because two channels-NICs are enough to provide the maximum throughput for this request size. After the second 30, when the request size changes to 16 kB, the method turns on one channel on each NUMA node, the steps around the 35 second shows this behavior. Then, when the request size is 1 MB, the method turns on a third channel per node. At this moment, all the NICs are working, and the corresponding channels will be on until the request size changes again to 4 kB, at the second 125. At this point, the system turns off four channels, two per node, and keeps active only two channels.

Finally, when the request size changes to 1 MB, the channels are turned on again, and the maximum throughput will be reached.

When only two NICs are on, and we increase the request size, from 4 kB to 16 kB, from 16 kB to 1 MB, and from 4 kB to 1 MB, FIG. 18 depicts steps on the curves every five seconds. These steps show how Elas is turning on two channels (one per NUMA node). However, when channels are turned off, it is not possible to see these steps on the throughput curve, because the throughput just drops, although, the steps appear on the curve for the number of NICs.

Application Results

Table VII shows the throughput for Psearchy, Blast, IOR and HBase. These tests were chosen because they perform a significant amount of I/O and allow for the observation of differences at the network protocol level. In testing, Tyche always performs better than NBD and TSockets, even with a single NIC. For Psearchy and IOR, the difference between Tyche and NBD is remarkable, Tyche achieves more than 2× and 8× better throughput than NBD with 1 and 6 NICs respectively. For Blast and HBase-Read, the differences are smaller, but Tyche is still up 2× better than NBD. For HBase-Insert, Tyche outperforms NBD by 7% and 10% with 1 and 6 NICs, respectively. When comparing with TSockets, the differences are smaller but still significant, with more than 2× improvement for Psearchy and IOR. For Blast, HBase-Read, and HBase-Insert, Tyche outperforms the vanilla version by 36%, 22%, and 18%, respectively, when 6 NICs are used.

TABLE VII

| Throughput (MB/s) | Tyche | | NBD | TSockets | |
| --- | --- | --- | --- | --- | --- |
| NICs | 1 | 6 | 1 | 1 | 6 |
| Psearchy | 1,154 | 4,117 | 499 | 488 | 1,724 |
| Blast | 775 | 882 | 438 | 391 | 564 |
| IOR-R 512k | 573 | 1,670 | 212 | 226 | 745 |
| IOR-W 512k | 603 | 1,670 | 230 | 243 | 751 |
| HBase-Read | 303 | 295 | 154 | 168 | 229 |
| HBase-Insert | 106 | 112 | 99 | 54 | 92 |

Regarding network storage protocols iSCSI and NBD are built over TCP/IP and are widely used in Linux. By contrast, Tyche uses its own Ethernet-based transport, which incurs less overhead. HyperSCSI modifies iSCSI to use raw Ethernet instead of TCP/IP. It turns Ethernet into a usable storage infrastructure by adding missing components, such as flow control, segmentation, reassembly, encryption, access control lists and security. Compared to HyperSCSI, Tyche is designed to transparently use multiple NICs, it deals with NUMA and synchronization issues, it uses RDMA-like operations that reduce packet processing, and it employs a copy reduction technique. All the techniques used in Tyche and described in this disclosure could also be incorporated in HyperSCSI as well.

RDMA has been used extensively by protocols, such as iSER (iSCSI Extension for RDMA), SCSI RDMA Protocol (SRP), and RDMA-assisted iSCSI which improve the performance of iSCSI by taking advantage of RDMA-operations. Other protocols are Internet Wide Area RDMA Protocol (iWARP) and RDMA over Converged Ethernet (RoCE) which are the two commonly known RDMA technologies over Ethernet. The former defines how to perform RDMA over TCP. The latter defines how to perform RDMA over a Ethernet link layer. SMB2 Remote Direct Memory Access (RDMA) Transport Protocol by Microsoft is an example of network storage that requires iWARP, Infiniband or RoCE protocols to provide RDMA operations. However, all these protocols focus on providing RDMA capabilities by using hardware support. Tyche is capable of using existing Ethernet and exploring issues at the software interface between the host and the NIC, which emerges as an important bottleneck for high-speed communication in networked storage.

Regarding the copy reduction technique, the Tyche approach is superior to previous approaches because it avoids making a copy at kernel space by ensuring that Ethernet frames are prepared properly and then interchanging pages between the Ethernet ring and the Tyche queues, specifically targeting our storage protocol that transfers multiples of 4 kB.

A significant amount of work has been done for NUMA-aware process scheduling and memory management in the context of many-core processors and systems. For instance, studies have been conducted on the effects of high-speed networking in multi-core systems and show that placing a task on a node far from the network interface leads to a performance drop, and especially bandwidth. Test results show that NUMA effects on throughput are asymmetric since only the target destination buffer appears to need placement on a NUMA node close to the interface. In Tyche, NUMA affects both sides, target and initiator. Systems have been proposed that integrate an RDMA-capable protocol (iSER), multi-core NUMA tuning, and an optimized back-end storage area network. These systems apply NUMA affinity by using the numactl utility for binding a dedicated target process to each logical NUMA node. These systems use iSER that relies on hardware support to provide RDMA capabilities. In contrast, Tyche provides 3o RDMA-type operations without hardware support. Other systems achieve an improvement of up to 19% in throughput for write operations, whereas Tyche achieves an improvement of up to 2×.

Unlike other approaches that closely attach NIC to CPU and memory, requiring extensive hardware support, Tyche uses general purpose Ethernet NICs.

The gmblock project is a block-level storage sharing system over Myrinet which transfers data directly between the storage device and the network, bypassing the CPU and main memory bus of the storage server. Although for sending request, data is sent directly from the storage device to the network, when receiving, a copy operation is needed between the NIC SRAM and the Lanai RAM. Tyche does not aim to by-pass the target, but rather to optimize the communication path to the target, allowing for storage functions, such as I/O caching, to be performed by the target.

To address various issues related to, and improve upon, previous work, the application is directed to NETWORK STORAGE PROTOCOL AND ADAPTIVE BATCHING APPARATUSES, METHODS, AND SYSTEMS. The entirety of this application shows by way of illustration various embodiments. The advantages and features disclosed are representative; they are not exhaustive or exclusive. They are presented only to assist in understanding and teaching the claimed principles. It should be understood that they are not representative of all claimed inventions. As such, certain aspects of the invention have not been discussed herein. That alternate embodiments may not have been presented for a specific portion of the invention or that further undescribed alternate embodiments may be available for a portion of the invention is not a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope of the invention.

As such, all examples and embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, including continuations, continuations-in-part, divisions, and any other application. As such, it should be understood that advantages, embodiments, examples, functionality, features, logical aspects, organizational aspects, structural aspects, topological aspects, and other aspects of the disclosure are not to be considered limitations on the disclosure as defined by the claims or limitations on equivalents to the claims.

The invention claimed is:

1. A computer network-storage protocol system comprising:
   a storage initiator device comprising:
   a storage initiator block-device layer comprising a first data message buffer and a first request message buffer, the storage initiator block-device layer configured to acquire a first data message including first data pages from the first data message buffer and a first request message including request parameters from the first request message buffer; and
   an initiator network layer comprising a first request transmission device corresponding to the first request message buffer and a first data transmission device corresponding to the first data message buffer, the initiator network layer further interfacing with a first network driver and configured to control transmission of the first data message and first request message to the first network driver;
   a storage target device comprising:
   a storage target block-device layer comprising a second data message buffer and a second request message buffer, the storage target block-device layer configured to receive the first data message and the first request message; and a target network layer comprising a first request receiving device corresponding to the second request message buffer and a second data receiving device corresponding to the second data message buffer, the target network layer further interfacing with a second network driver and configured to control transmission of the first data message and first request message to the second message buffer and the second request transmission device, respectively;

a plurality of network interface controllers (NICs) interfacing with the first network driver and the second network driver; and a plurality of distinct channels, each channel establishing a connection between the storage initiator device and the storage target device and being configured to transmit data packets between the storage initiator device and the storage target device, wherein each channel is mapped to only one NIC of the plurality of NICs, and each NIC of the plurality of NICs is mapped to multiple channels of the plurality of channels, and wherein each channel of the plurality of channels has a private resource allocated to it from the first data message buffer and the second data message buffer, each channel of the plurality of channels has another private resource allocated to it from the first request message buffer and the second request message buffer.

2. The system of claim 1, wherein the target network layer further includes a notification device.

3. The system of claim 1, wherein the first request transmission device and first data transmission device are accessed only via non-blocking atomic operations.

4. The system of claim 1, wherein the first request receiving device and first data receiving device are accessed only via non-blocking atomic operations.

5. The system of claim 1, further comprising a scheduler configured to select a channel through which a next request will be issued when multiple channels are open between the storage initiator device and the storage target device, wherein the scheduler is configured to select the channel based on memory locality.

6. The system of claim 5, wherein the scheduler is configured to select the channel based on memory locality by identifying a particular NIC that is located in a same node as a buffer that stores the next request and selecting a channel associated with the particular NIC.

7. The system of claim 1, wherein the storage initiator device is configured to dynamically add and remove NICs and channels to the system without rebooting the system.

8. The system of claim 1, wherein the storage initiator device is configured to determine whether or not to use NICs and channels already connected to the system depending on a throughput achieved for a current workload.

9. The system of claim 1, wherein the storage initiator device is configured to reduce packet processing overhead in a receive path by reading a header from each packet, wherein the header includes a local position in a transmission structure as well as a position in a receiving structure.

10. The system of claim 1, wherein the storage initiator device is further configured to implement adaptive batching by dynamically calculating throughput and optimizing a batch size calculated to maximize throughput.

11. The system of claim 1, wherein the storage initiator device is further configured to:
  receive an input/output (I/O) request;
  dynamically detect where the first request message buffer is allocated;
  identify an NIC that is located in a same non-uniform memory access (NUMA) node as the first request message buffer; and
  assign the I/O request to a channel that uses the identified NIC.

12. The system of claim 1, wherein the storage initiator device further comprises a plurality of cores, wherein each channel is mapped to one core of the plurality of cores.

13. The system of claim 1, wherein the storage initiator device is configured to operate in an inline mode by issuing an input/output (I/O) request to the storage target device without requiring any context switch in an issue path.

14. The system of claim 1, wherein the storage initiator device is configured to operate in a queue mode by inserting I/O requests into a queue where a plurality of threads are configured to dequeue the I/O requests and issue them to the storage target device.

15. The system of claim 1, wherein the first and second network drivers are Ethernet drivers.

16. A method of initializing a network stack, the method comprising:
  opening a plurality of channels between a storage initiator device and a storage target device,
  wherein the storage initiator device comprises a storage initiator block-device layer comprising a first data message buffer and a first request message buffer, the storage initiator device further comprises an initiator network layer comprising a first request transmission device corresponding to the first request message buffer and a first data transmission device corresponding to the first data message buffer,
  and wherein the storage data device comprises a storage target block-device layer comprising a second data message buffer and a second request message buffer, the storage data device further comprises a first request receiving device corresponding to the second request message buffer and a second data receiving device corresponding to the second data message buffer;
  exchanging information between the storage initiator device and the storage target device during a handshake phase, wherein the exchanging includes specifying, by the storage initiator device, one or more positions within the second data message buffer where data is to be placed by the storage target device during a write request;
  creating a local virtual device on the storage initiator device for the storage target device;
  mapping each of the plurality of channels to a single network interface controller (NIC) of a plurality of NICs, wherein each NIC of the plurality of NICs is mapped to multiple channels of the plurality of channels, wherein each channel of the plurality of channels is allocated its own private resources, wherein each channel of the plurality of channels has a private resource allocated to it from the first data message buffer and the second data message buffer, each channel of the plurality of channels has another private resource allocated to it from the first request message buffer and the second request message buffer;
  receiving an input/output (I/O) request from a file system at the storage initiator device to be issued to the storage target device; and
  transmitting the I/O request through one of the plurality of channels, wherein the channel passes through the storage block-device layer and the network layer in the storage initiator device as well as the storage block-device layer and the network layer in the storage target device.

17. The method of claim 16, wherein for each channel connecting the storage initiator device and the remote storage target device, the network layer in the storage initiator device includes at least one transmission device.

18. A network storage system comprising:
a plurality of networked memory devices;
a plurality of processors operably connected to the memory devices;
a storage initiator device residing in at least one of the plurality of networked memory devices and comprising:
   a storage initiator block-device layer comprising a first data message buffer and a first request message buffer, the storage initiator block-device layer configured to acquire a first data message including first data pages from the first data message buffer and a first request message including request parameters from the first request message buffer; and
   an initiator network layer comprising a first request transmission device corresponding to the first request message buffer and a first data transmission device corresponding to the first data message buffer, the initiator network layer further interfacing with a first network driver and is configured to control transmission of the first data message and first request message to the first network driver;
a storage target device residing in at least one of the plurality of networked memory devices and having a storage target block-device layer and comprising:
   a storage target block-device layer comprising a second data message buffer and a second request message buffer, the storage target block-device layer configured to receive the first data message and the first request message; and
   a target network layer comprising a first request receiving device corresponding to the second request message buffer and a second data receiving device corresponding to the second data message buffer, the target network layer further interfacing with a second network driver and configured to control transmission of the first data message and first request message to the second message buffer and the second request transmission device, respectively;
a plurality of network interface controllers (NICs) interfacing with the first network driver and the second network driver; and
a plurality of channels, each channel establishing a connection between the storage initiator device and the storage target device and being configured to transmit data packets between the storage initiator device and the storage target device,
wherein each channel is mapped to only one NIC of the plurality of NICs, and each NIC of the plurality of NICs is mapped to multiple channels of the plurality of channels, and
wherein each channel of the plurality of channels has a private resource allocated to it from the first data message buffer and the second data message buffer, each channel of the plurality of channels has another private resource allocated to it from the first request message buffer and the second request message buffer.

* * * * *